US012571954B2

(12) United States Patent
George et al.

(10) Patent No.: US 12,571,954 B2
(45) Date of Patent: Mar. 10, 2026

(54) OPTICAL DEVICE WITH A FLEXIBLE, OPAQUE-REGION

(71) Applicant: Moxtek, Inc., Orem, UT (US)

(72) Inventors: Matthew C. George, Lindon, UT (US); Daniel Bacon-Brown, Orem, UT (US)

(73) Assignee: Moxtek, Inc., Orem, UT (US)

( * ) Notice: Subject to any disclaimer, the term of this patent is extended or adjusted under 35 U.S.C. 154(b) by 681 days.

(21) Appl. No.: 17/730,331

(22) Filed: Apr. 27, 2022

(65) Prior Publication Data

US 2022/0381963 A1 Dec. 1, 2022

Related U.S. Application Data

(60) Provisional application No. 63/195,267, filed on Jun. 1, 2021.

(51) Int. Cl.
| | |
|---|---|
| *G02B 5/30* | (2006.01) |
| *G02B 1/04* | (2006.01) |
| *G02B 1/08* | (2006.01) |

(52) U.S. Cl.
CPC .............. *G02B 5/305* (2013.01); *G02B 1/08* (2013.01); *G02B 5/3058* (2013.01); *G02B 1/043* (2013.01)

(58) Field of Classification Search
CPC ........ G02B 5/305; G02B 1/08; G02B 5/3058; G02B 1/043
See application file for complete search history.

(56) References Cited

U.S. PATENT DOCUMENTS

| | | | | |
|---|---|---|---|---|
| 6,288,840 B1* | 9/2001 | Perkins | ............... | G02B 5/3058 |
| | | | | 359/485.05 |
| 7,414,784 B2* | 8/2008 | Mi | ........................ | G02B 5/3058 |
| | | | | 359/485.05 |
| 7,961,393 B2* | 6/2011 | Perkins | ............... | G02B 5/3058 |
| | | | | 359/485.05 |
| 8,142,016 B2 | 3/2012 | Legerton et al. | | |
| 8,922,898 B2 | 12/2014 | Legerton et al. | | |
| 9,632,224 B2* | 4/2017 | Nielson | ............... | H04N 9/3167 |
| 9,684,203 B2 | 6/2017 | Nielson et al. | | |
| 10,175,401 B2 | 1/2019 | Nielson et al. | | |

(Continued)

OTHER PUBLICATIONS

Jonathan A Fan, Fractal design concepts for stretchable electronics, Nature Communications, Published Feb. 7, 2014, pp. 1-26, 5:3266, Macmillan Publishers Limited.

*Primary Examiner* — Thomas K Pham
*Assistant Examiner* — Ruby L Kauffman
(74) *Attorney, Agent, or Firm* — Thorpe North & Western, LLP

(57) ABSTRACT

Optical devices with different regions or pixels can form an image. An opaque-region 14 can be used to separate different pixels. Sometimes the optical device needs to be flexible, for elongation or stretching onto a curved surface. But, the opaque-region 14 can be damaged as it is stretched. A flexible optical device can include a modified opaque-region 14 for improved flexibility. The opaque-region 14 can include a thin-film 12 with multiple cavities 13, multiple zones 63, or both. Each zone 63 can have a shape optimized to both block incoming light and for flexibility. Each zone 63 can be encircled and separated from adjacent zones 63 by a groove 62. The cavities 13 and the separate zones 63 can allow the opaque-region 14 to bend or stretch without cracking or delamination of the thin-film 12.

20 Claims, 18 Drawing Sheets

(56)  References Cited

U.S. PATENT DOCUMENTS

| 10,571,614 | B2 | | 2/2020 | Nielson et al. | |
| 10,761,252 | B2 | | 9/2020 | Nielson et al. | |
| 2008/0225402 | A1 | * | 9/2008 | Ballet | B29D 11/00634 |
| | | | | | 359/655 |
| 2008/0316599 | A1 | * | 12/2008 | Wang | G02B 5/3058 |
| | | | | | 359/485.05 |
| 2013/0044373 | A1 | * | 2/2013 | Kaida | G02B 5/3058 |
| | | | | | 359/485.05 |
| 2016/0139313 | A1 | * | 5/2016 | Kim | G02B 5/3058 |
| | | | | | 359/485.05 |
| 2016/0147080 | A1 | * | 5/2016 | Son | G02B 5/008 |
| | | | | | 427/163.1 |
| 2017/0219825 | A1 | * | 8/2017 | Benoit | G02B 5/305 |
| 2018/0105921 | A1 | * | 4/2018 | Cui | G02B 5/3058 |
| 2018/0188433 | A1 | * | 7/2018 | Kim | G02B 5/3058 |
| 2020/0133061 | A1 | * | 4/2020 | Lo | G02F 1/133514 |
| 2021/0129465 | A1 | | 5/2021 | Marsh et al. | |
| 2022/0283341 | A1 | * | 9/2022 | Raksha | H01Q 15/0086 |

* cited by examiner

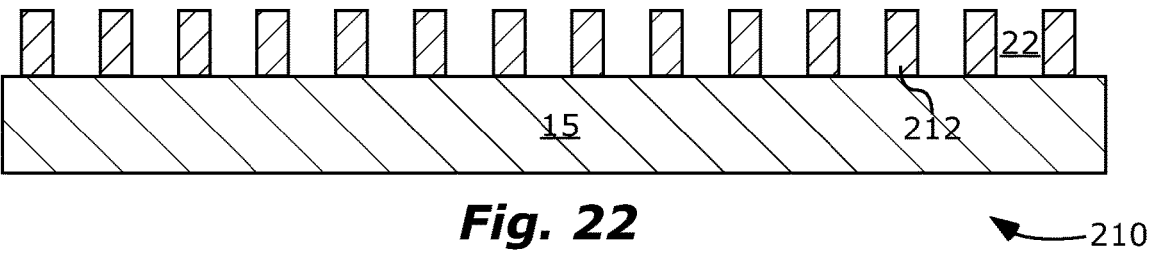
Fig. 22                                    210
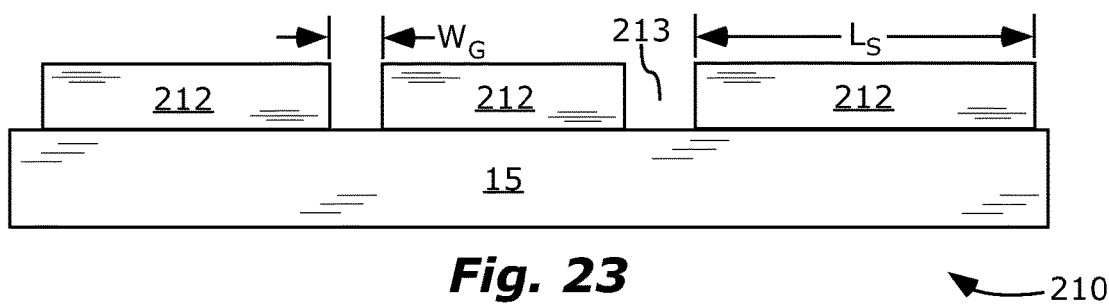
Fig. 23                                    210
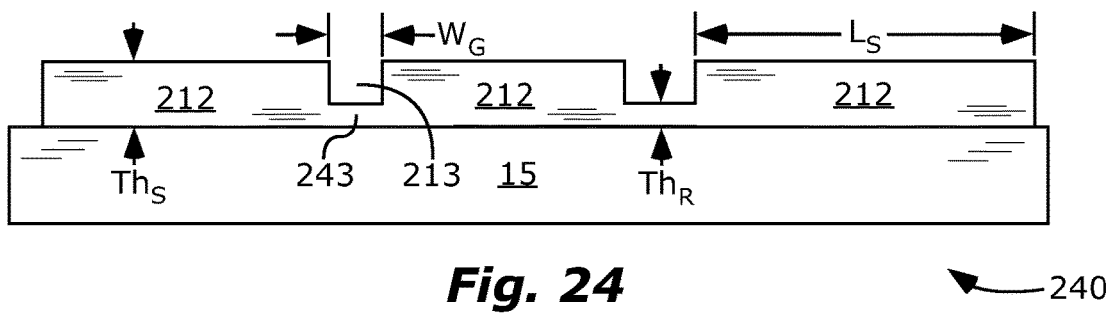
Fig. 24                                    240
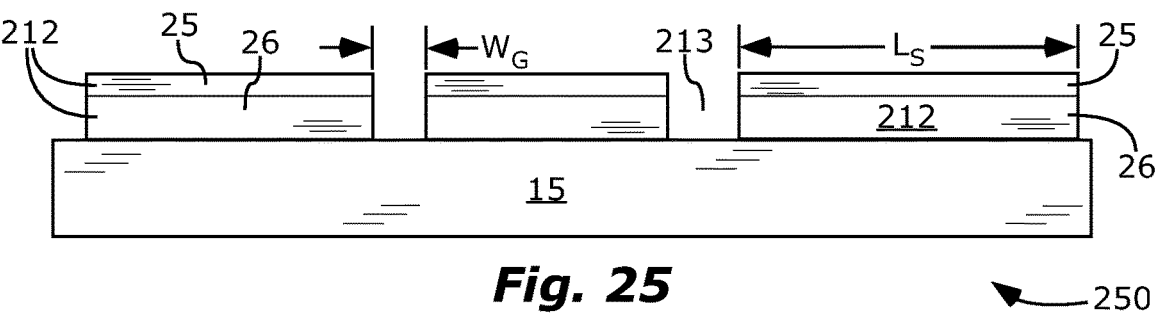
Fig. 25                                    250

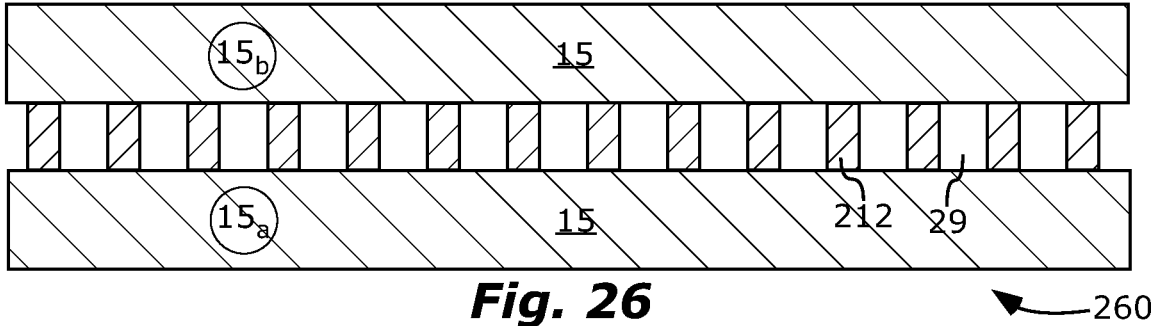
Fig. 26                              260
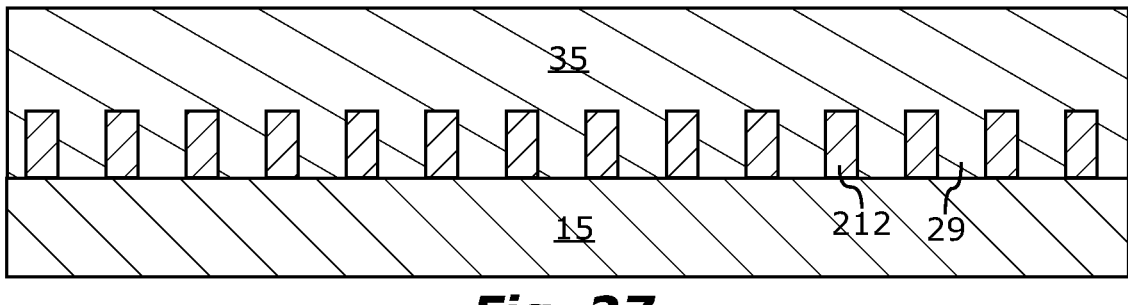
Fig. 27                              270

OPTICAL DEVICE WITH A FLEXIBLE, OPAQUE-REGION

CLAIM OF PRIORITY

This application claims priority to U.S. Provisional Patent Application No. 63/195,267, filed on Jun. 1, 2021, which is incorporated herein by reference.

FIELD OF THE INVENTION

The present application is related to optical devices, especially polarizers.

BACKGROUND

Optical devices with different regions or pixels can form an image. The different pixels can improve analysis of the image.

BRIEF DESCRIPTION OF THE DRAWINGS (DRAWINGS MIGHT NOT BE DRAWN TO SCALE)

Figure 1A:
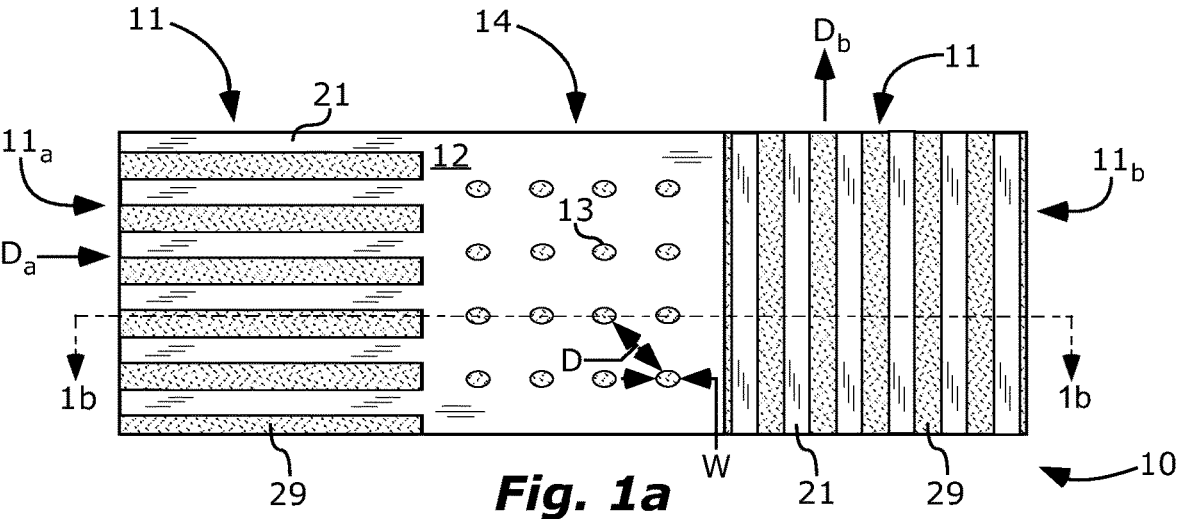

FIG. 1a is a top-view of a flexible optical device 10 with an opaque-region 14 adjacent to two polarizer regions 11. The opaque-region 14 can include a thin-film 12 with multiple cavities 13. The polarizer regions 11 and the opaque-region 14 can be located on a single, flexible substrate 15 (see FIG. 1b).

Figure 1B:
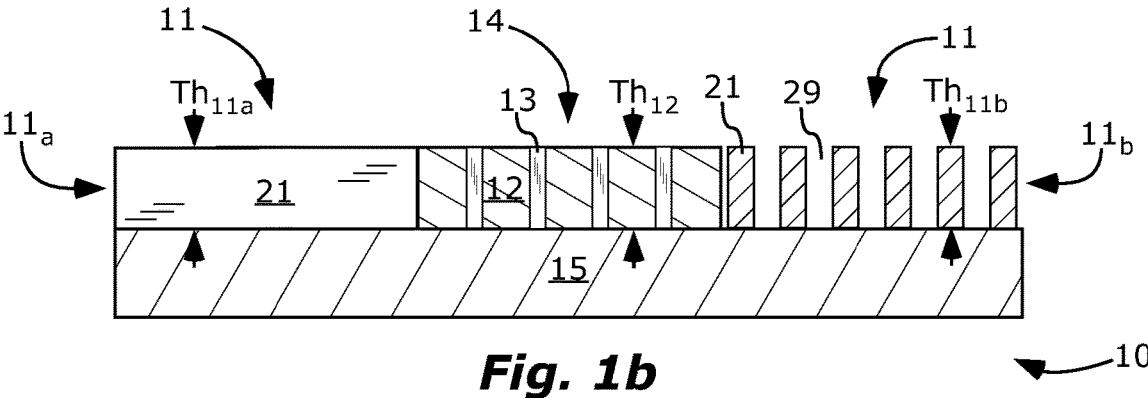

FIG. 1b is a cross-sectional side-view of the flexible optical device 10 of FIG. 1a, taken along line 1b-1b in FIG. 1a.

Figure 2A:
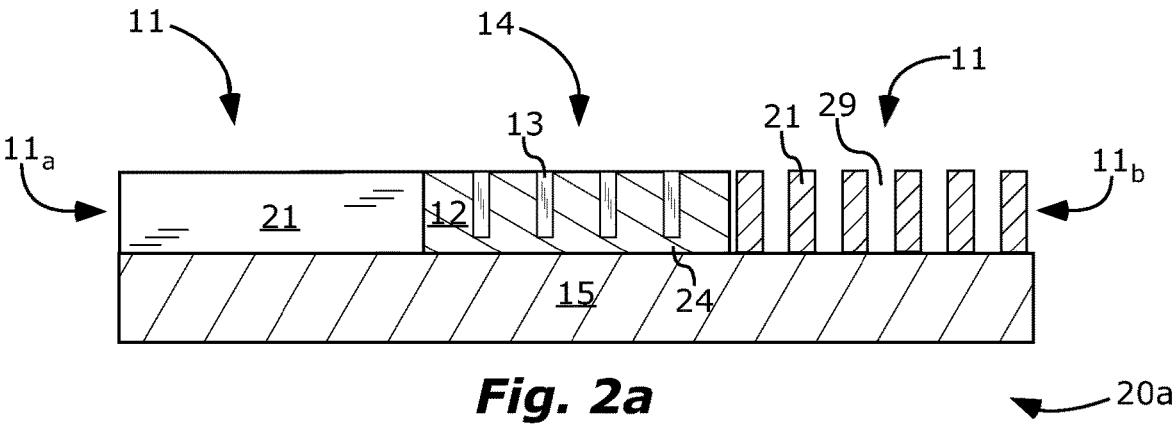

FIG. 2a is a cross-sectional side-view of a flexible optical device 20a, similar to the flexible optical device 10. The cavities 13 in optical device 20 don't perforate the thin-film 12, leaving behind a thinner region 24 of the thin-film 12.

Figure 2B:
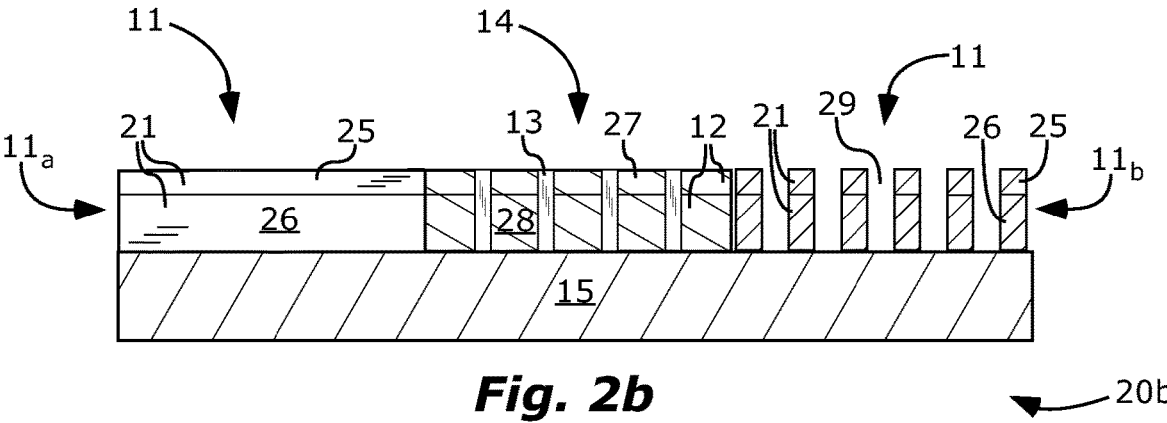

FIG. 2b is a cross-sectional side-view of a flexible optical device 20b, similar to the flexible optical devices 10 and 20a. In flexible optical device 20b, (a) the polarizer regions 11 include an array of wires 21, and each wire 21 includes a reflective rib 26 closer to the substrate 15 and an absorptive rib 25 farther from the substrate 15; and (b) the thin-film 12 includes a reflective layer 28 closer to the substrate 15 and an absorptive layer 27 farther from the substrate.

Figure 3A:
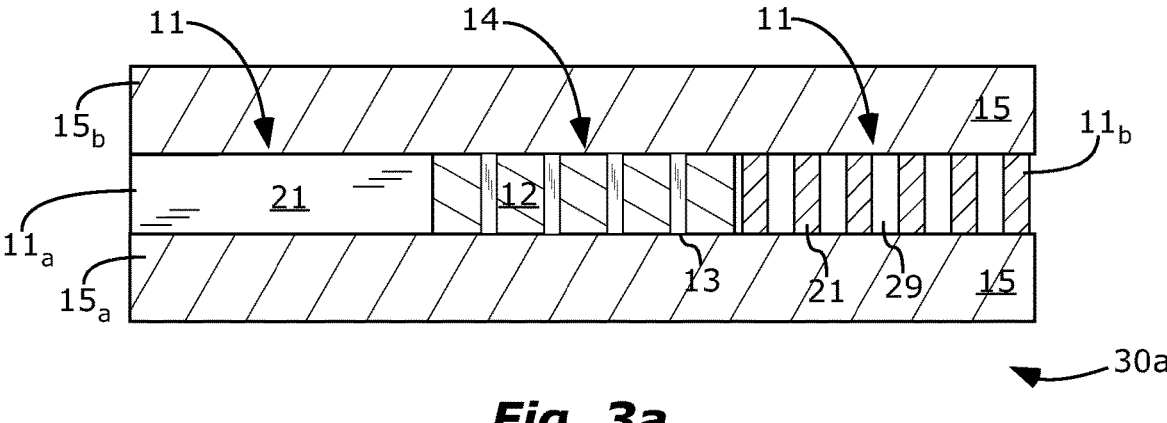

FIG. 3a is a cross-sectional side-view of a flexible optical device 30a, similar to the flexible optical devices 10, 20a, and 20b. In flexible optical device 30a, the polarizer regions 11 and the opaque-region 14 are sandwiched between a first substrate 15$_a$ and a second substrate 15$_b$.

Figure 3B:
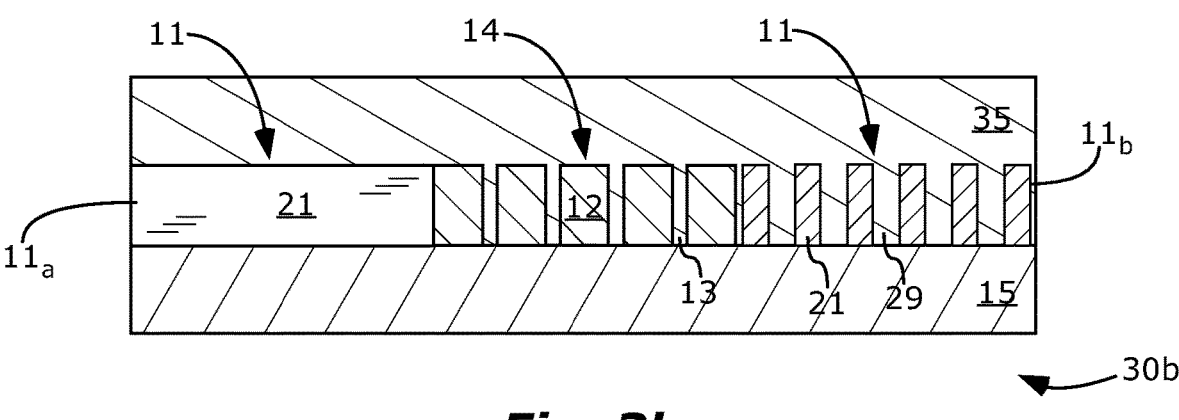

FIG. 3b is a cross-sectional side-view of a flexible optical device 30b, similar to the flexible optical devices 10, 20a, and 20b. Flexible optical device 30b further comprises a solid layer 35 on the polarizer regions 11 and the opaque-region 14. The solid layer 35 can extend into and fill the cavities 13 and channels 29 between adjacent wires 21.

Figure 4:
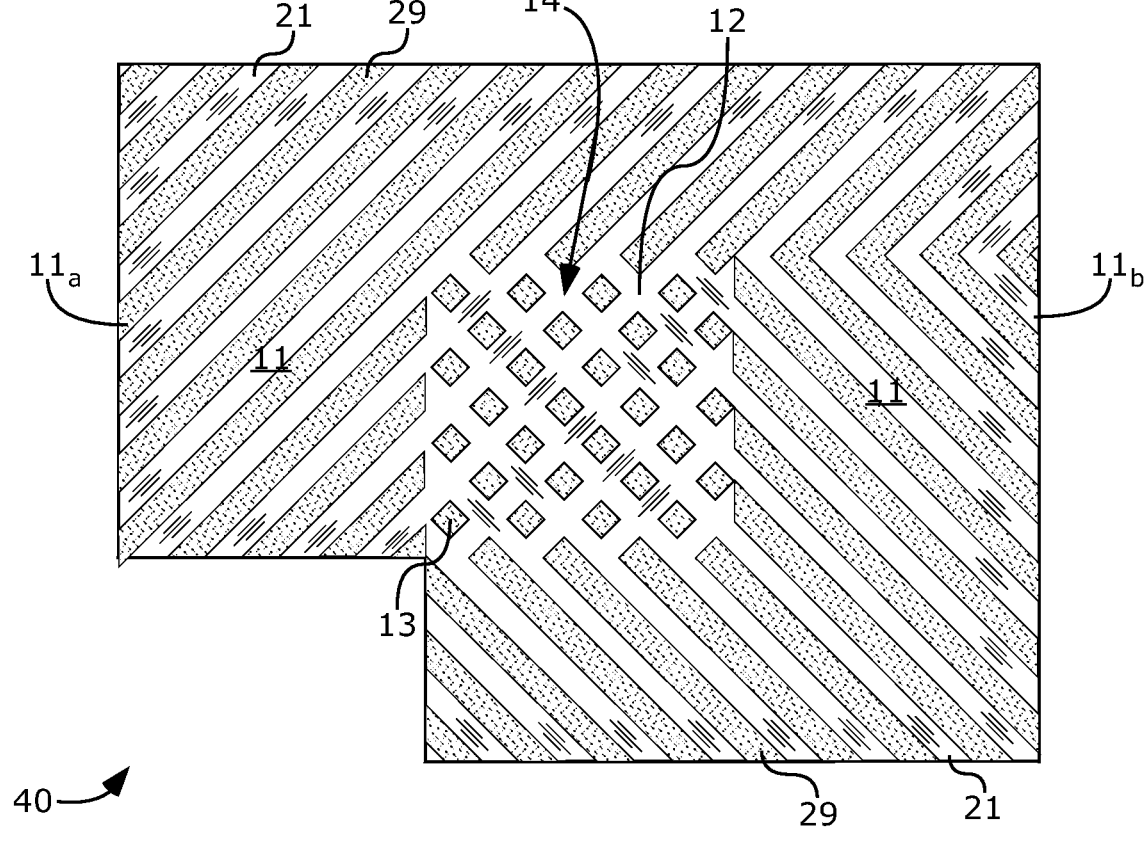

FIG. 4 is a top-view of a flexible optical device 40 with an opaque-region 14 adjacent to two polarizer regions 11. The opaque-region 14 can be formed by intersecting wires 21 of the polarizer regions 11. The cavities 13 are formed by intersecting channels 29 of the polarizer regions 11.

Figures 5, 6:
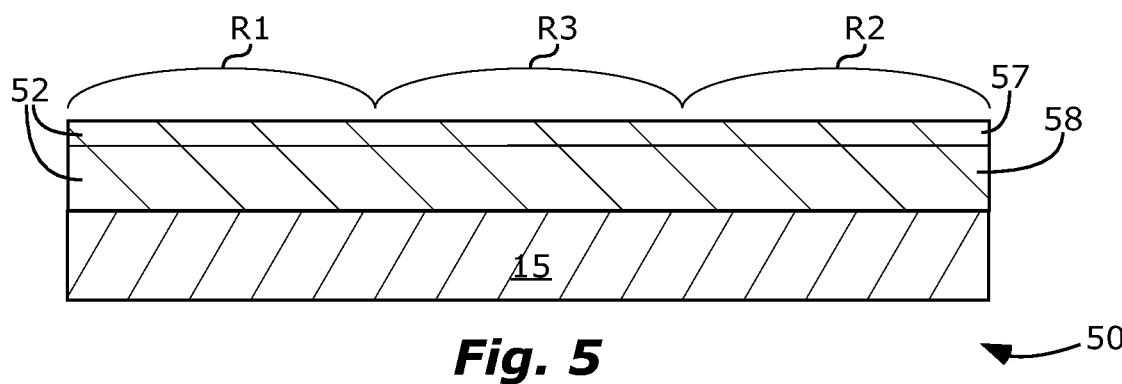

FIG. 5 is a cross-sectional side-view of a step 50 in a method of making a flexible optical device, including depositing a layer of material 52 on a flexible substrate 15.

FIG. 6 is a top-view of an opaque-region 14 having a thin-film 12 with multiple zones 63. Each zone 63 may or may not include multiple cavities 13. Each zone 63 can be encircled and separated from adjacent zones 63 by a groove 62.

Figure 7:
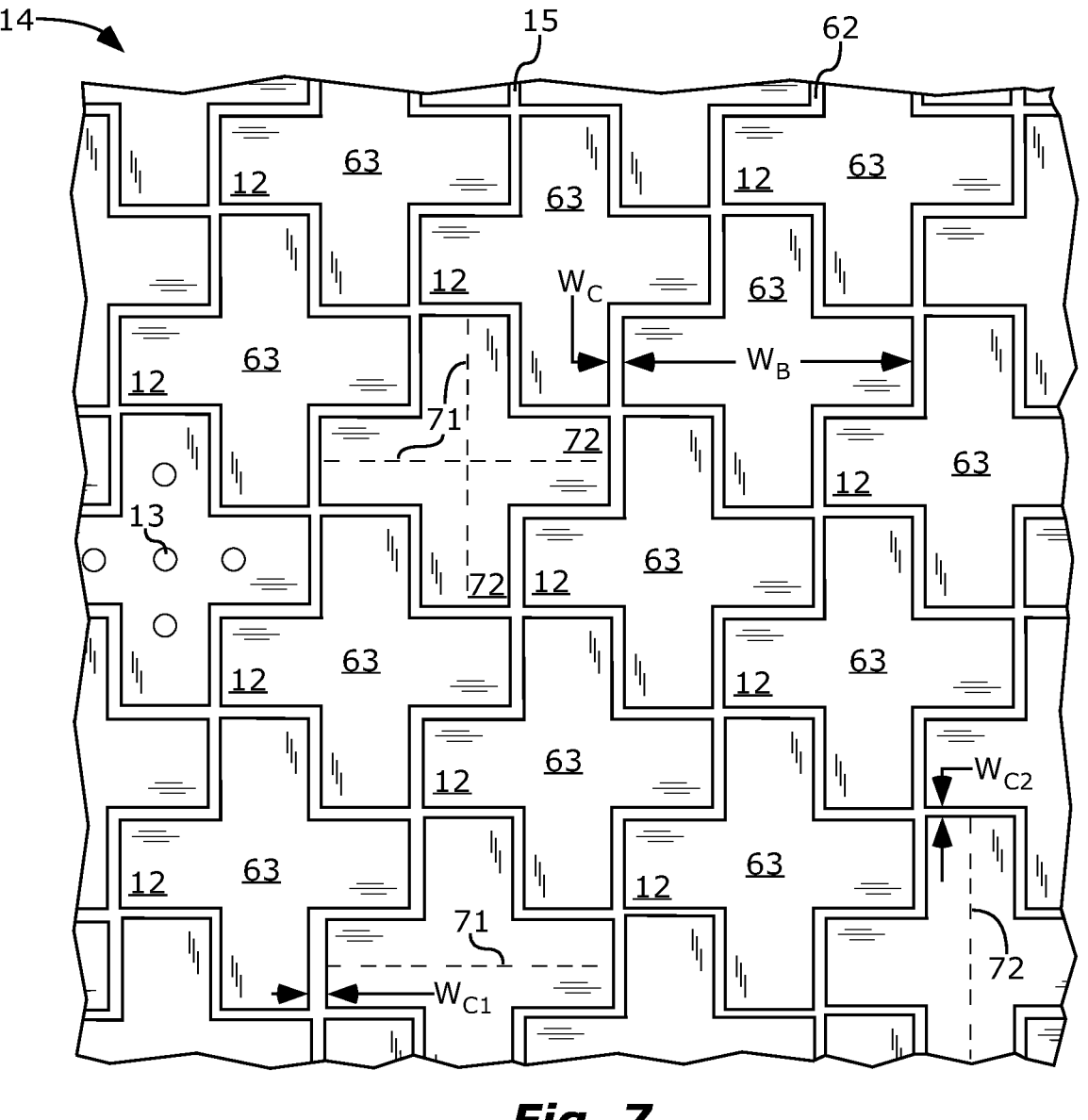

FIG. 7 is a top-view of an opaque-region 14 having a thin-film 12 with multiple zones 63. Each zone 63 can be at least partly encircled and separated from adjacent zones 63 by a groove 62. Each zone 63 can have a cross shape.

Figure 8:
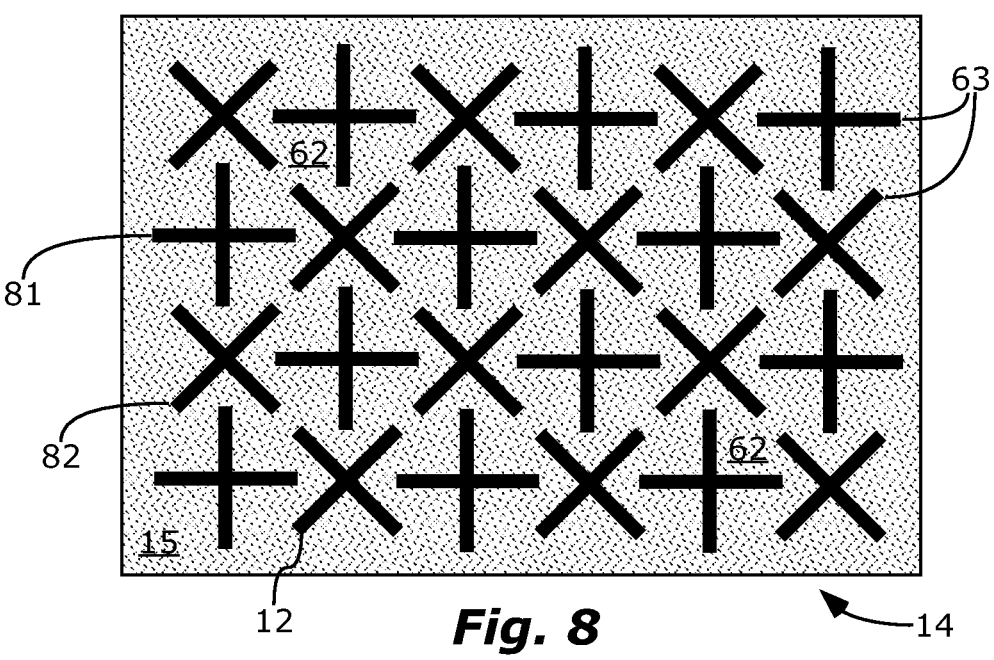

FIG. 8 is a top-view of an opaque-region 14 having a thin-film 12 with multiple zones 63 formed into an array of cross shapes. The cross shapes include a first orientation 81 and a second orientation 82, which are rotated with respect to each other.

Figure 9:
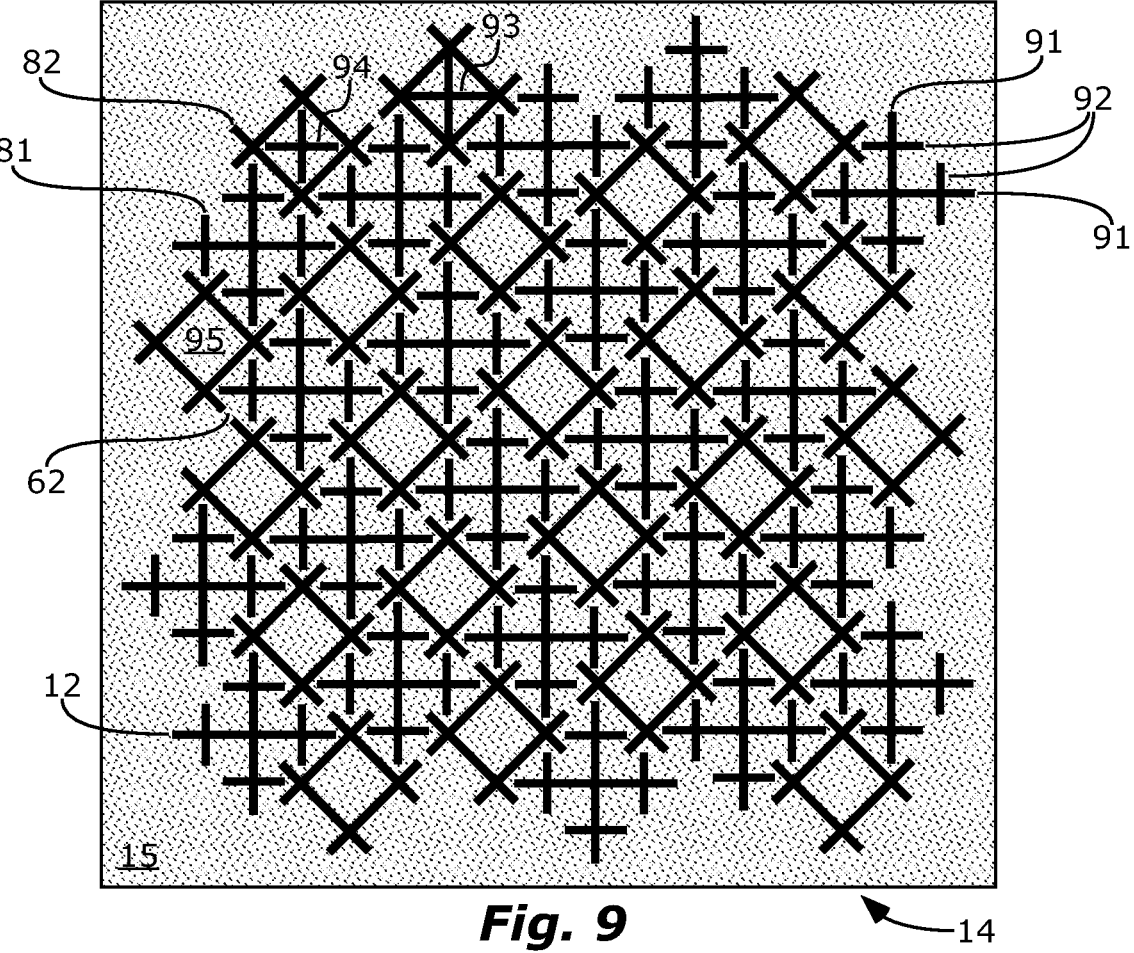

FIG. 9 is a top-view of an opaque-region 14 having a thin-film 12 with multiple zones 63 formed into an array of cross shapes. The cross shapes can include a first orientation 81 and a second orientation 82. The first orientation 81 includes a group of four crosses connected to each other, forming a larger cross 91 and smaller cross bars 92. The second orientation 82 includes a group of four crosses connected to form a square-shape 95.

Figure 10:
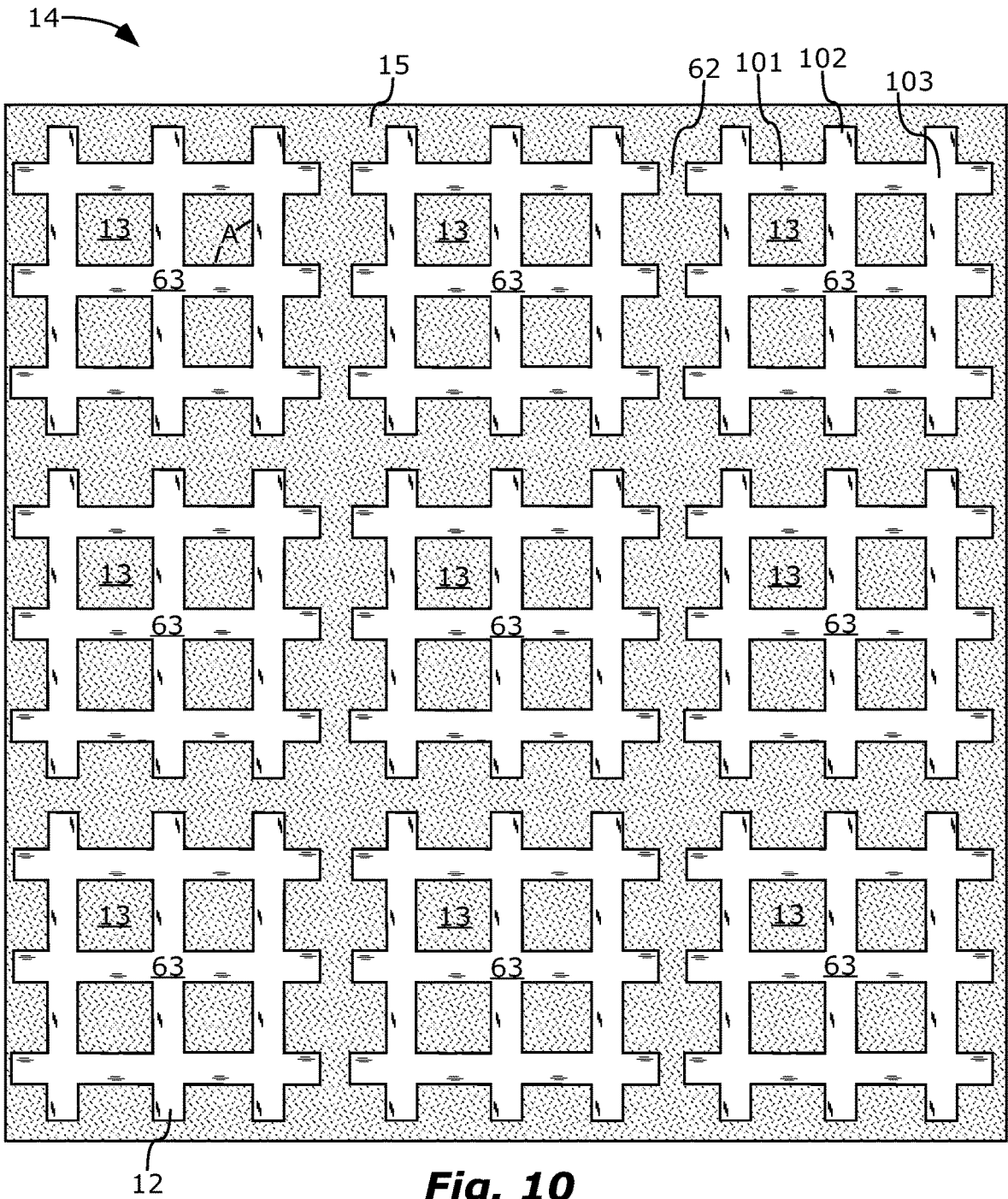

FIG. 10 is a top-view of an opaque-region 14 having a thin-film 12 with multiple zones 63. Each zone 63 can include intersecting wires 101 and 102 formed in the thin-film 12. Each zone 63 can be encircled and separated from adjacent zones 63 by a groove 62. Each zone 63 can include multiple cavities 13 formed by openings between the intersecting wires 101 and 102.

Figure 11:
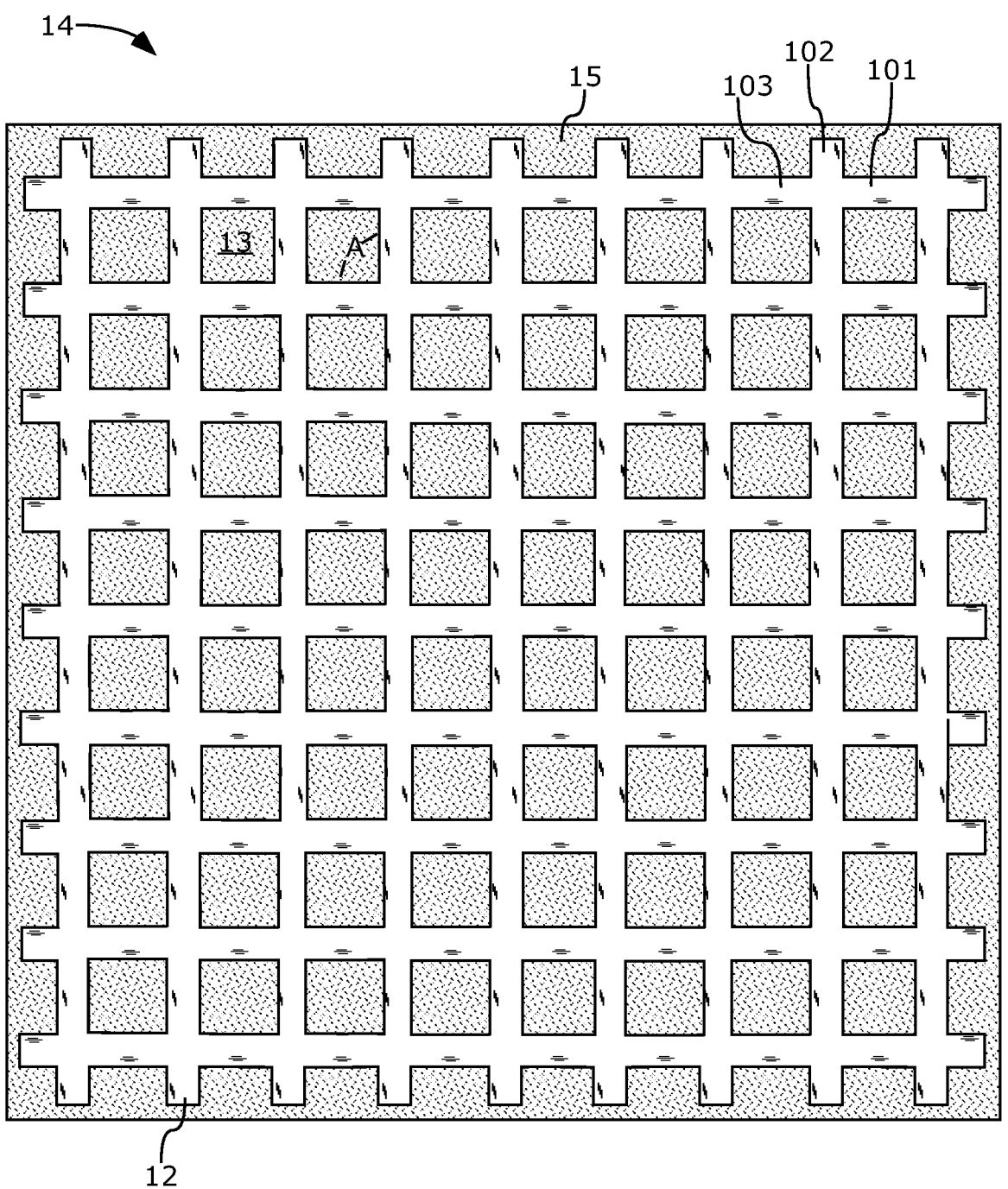

FIG. 11 is a top-view of an opaque-region 14 with intersecting wires 101 and 102 formed in a thin-film 12. Cavities 13 are formed by openings between the intersecting wires 101 and 102.

Figure 12:
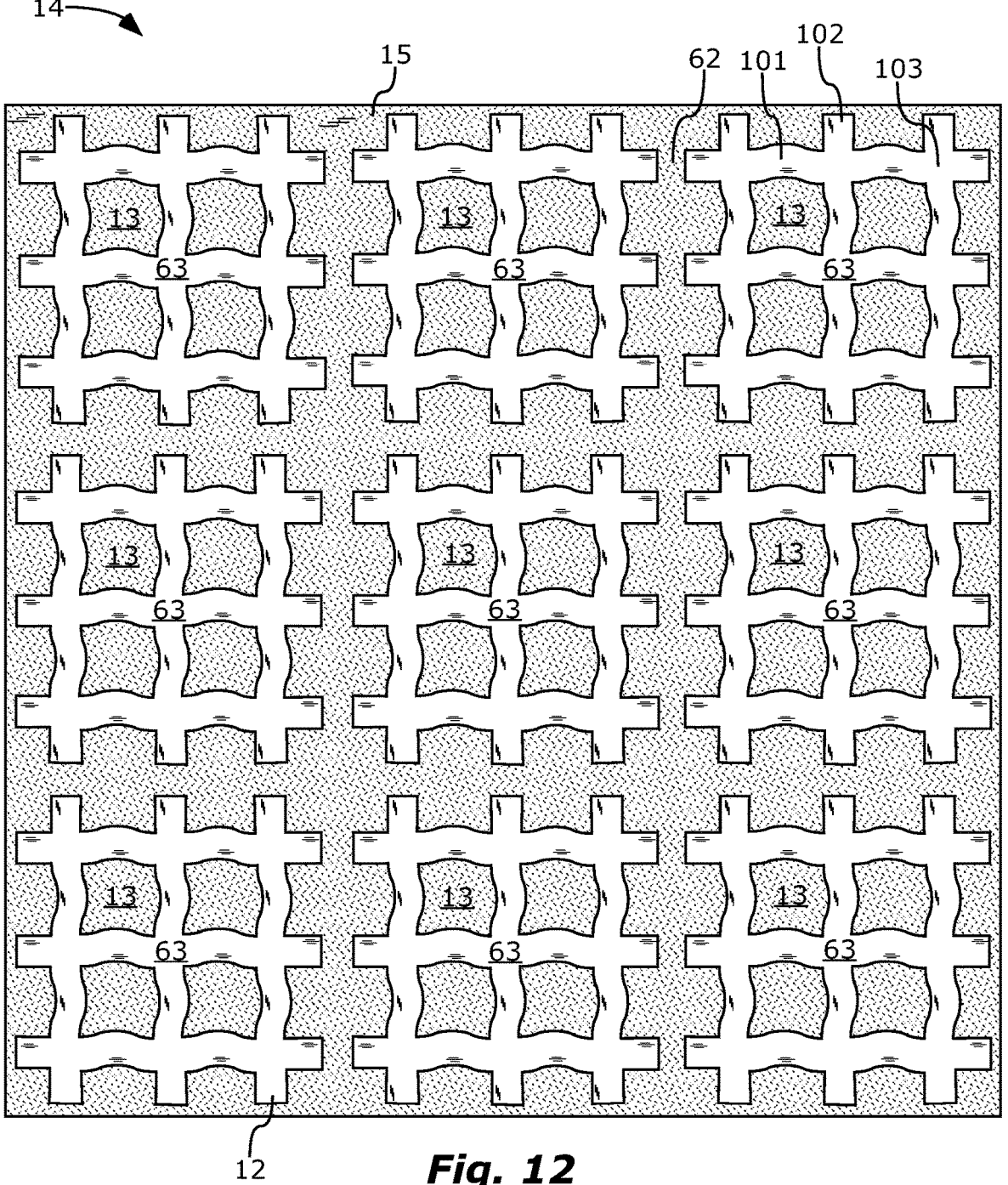

FIG. 12 is a top-view of an opaque-region 14, similar to the opaque-region 14 of FIGS. 10 and 11. In FIG. 12, the wires 101 and 102 have a serpentine or wavy shape.

Figure 13:
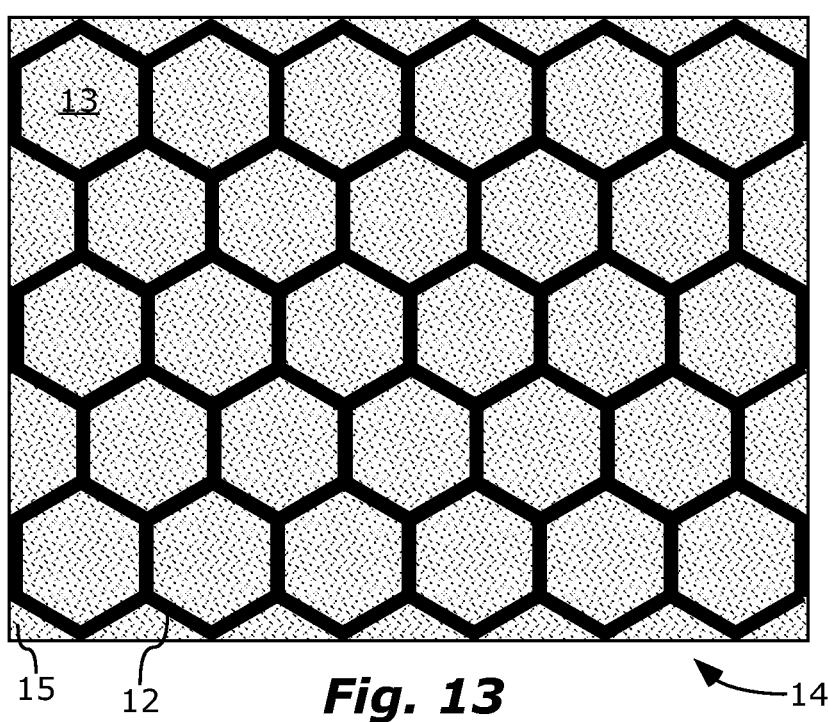

FIG. 13 is a top-view of an opaque-region 14 with a thin-film 12 forming intersecting hexagonal shapes. Cavities 13, each with a hexagonal shape, are formed by the shape of the thin-film 12.

Figure 14:
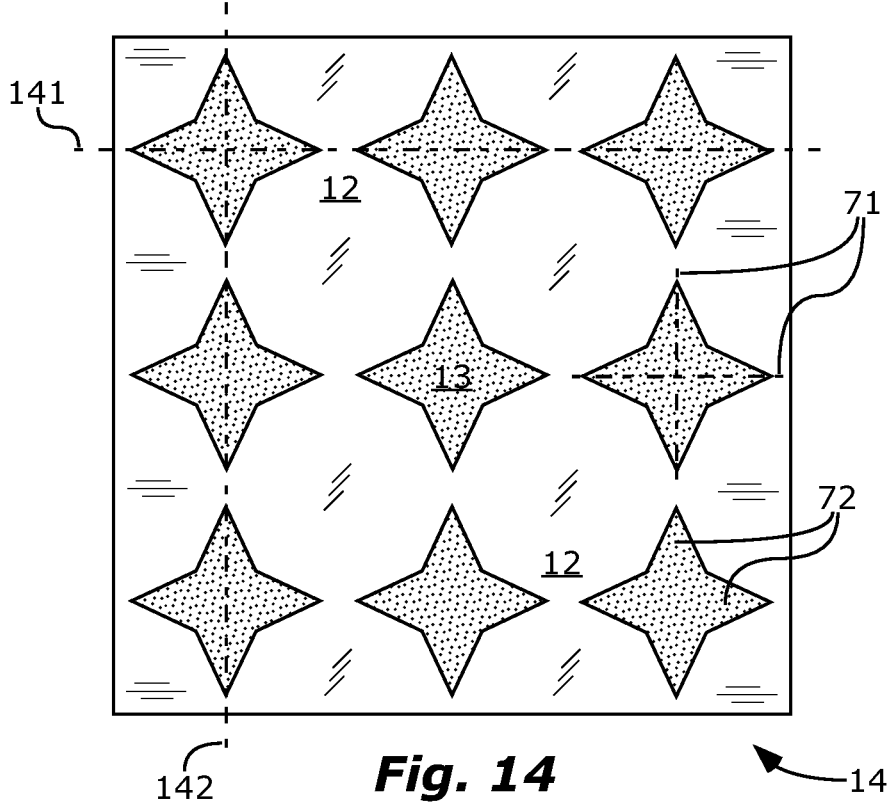

FIG. 14 is a top-view of an opaque-region 14 with a thin-film 12 and cavities 13 in the thin-film 12. The cavities are aligned into rows 141 and columns 142. Each cavity 13 has a cross shape. A longitudinal axes 71 corresponding to each bar 72 in the cross shape is aligned with a row 141 or column 142.

Figure 15:
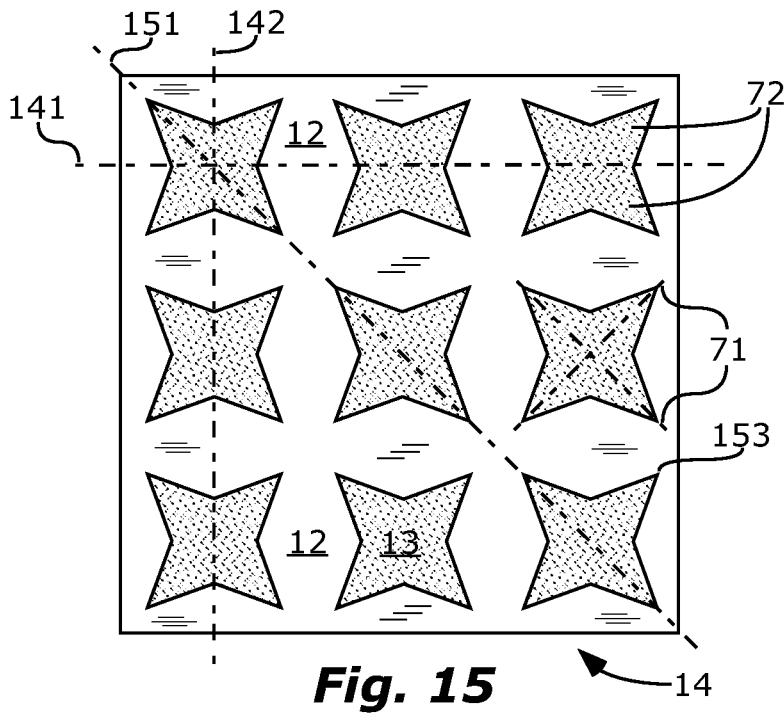

FIG. 15 is a top-view of an opaque-region 14 with a thin-film 12 and cavities 13 in the thin-film 12. Each cavity 13 has a cross shape. A longitudinal axis 71 of each bar 72 in the cross shape is aligned with a longitudinal axis 71 of the bar 72 in each cross shape of cavities in an offset row 141 and column 142.

Figure 16:
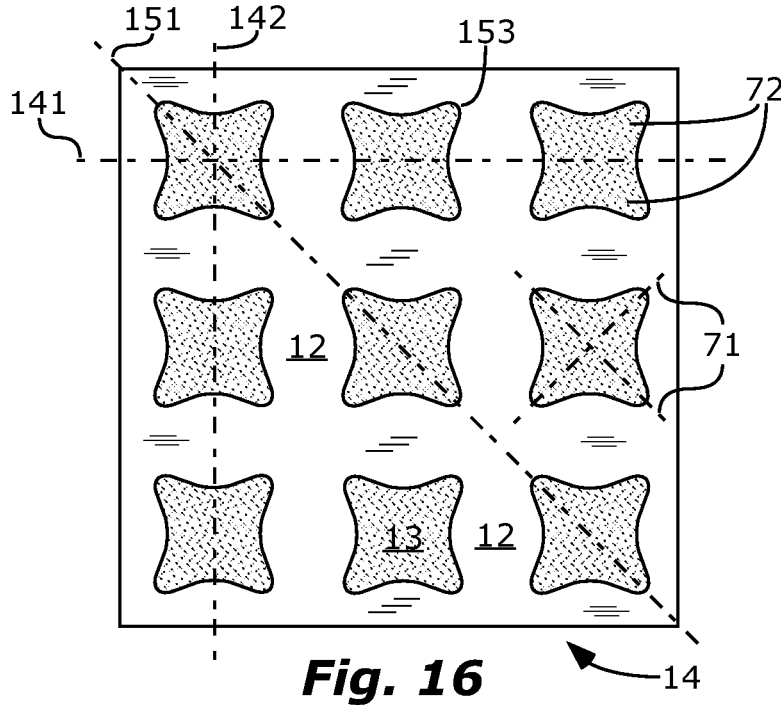

FIG. 16 is a top-view of an opaque-region 14 with a thin-film 12 and cavities 13 in the thin-film 12, similar to the opaque-region 14 of FIGS. 14-15, except that in FIG. 16, ends 153 of the cross shape are curved.

Figure 17:
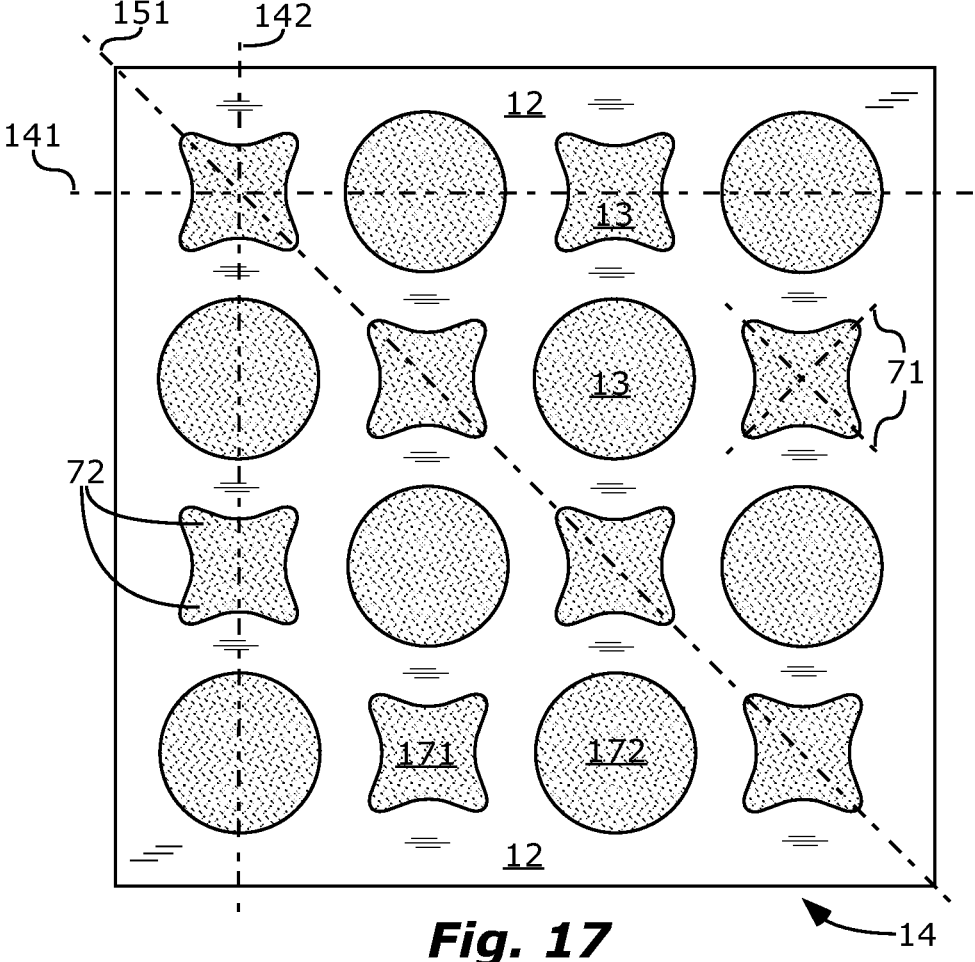

FIG. 17 is a top-view of an opaque-region 14 with a thin-film 12 and cavities 13 in the thin-film 12. Adjacent cavities 13 have different shapes with respect to each other.

Figure 18:
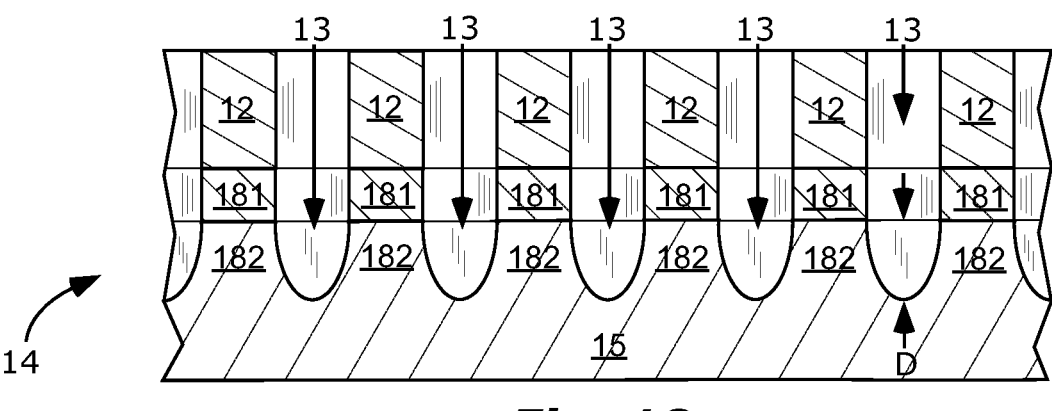

FIG. 18 is a cross-sectional side-view of an opaque-region 14 for a flexible optical device. The opaque-region 14 can include an etch stop 181 and a thin-film 12 on a flexible substrate 15. Multiple cavities 13 can extend through the thin-film 12, through the etch stop 181, and into the substrate 15, forming substrate ribs 182.

Figure 19:
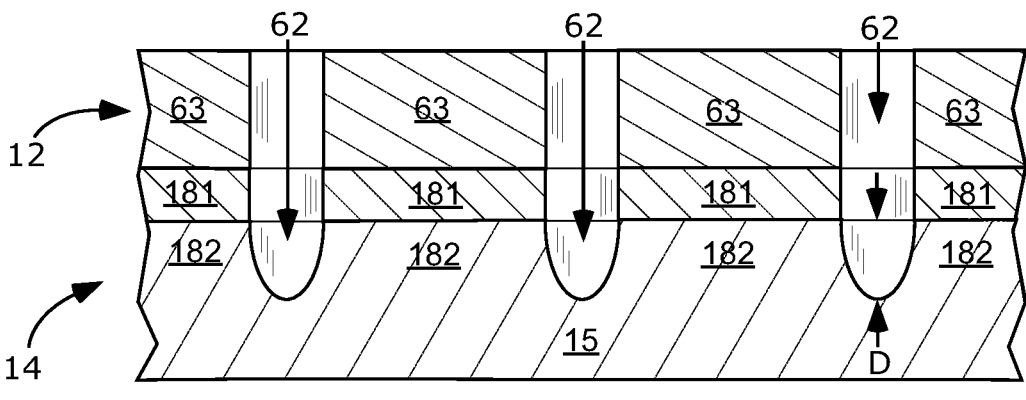

FIG. 19 is a cross-sectional side-view of an opaque-region 14 for a flexible optical device. The opaque-region 14 can include an etch stop 181 and a thin-film 12 with multiple zones 63 on a flexible substrate 15. Each zone 63 can be encircled and separated from adjacent zones 63 by a groove 62. Each groove 62 can extend through the thin-film 12, through the etch stop 181, and into the substrate 15, forming substrate ribs 182.

Figure 20:
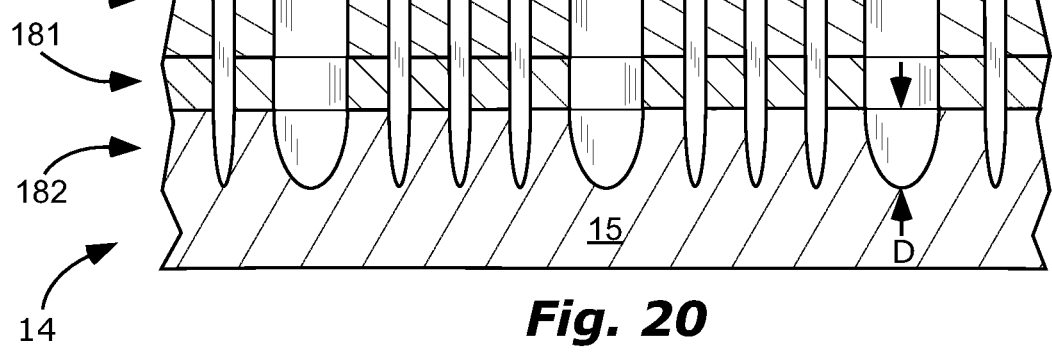

FIG. 20 is a cross-sectional side-view of an opaque-region 14 with combined features of FIGS. 18 and 19. The opaque-region 14 of FIG. 20 includes cavities 13 in, and a groove 62 around, each zone 63.

Figure 21:
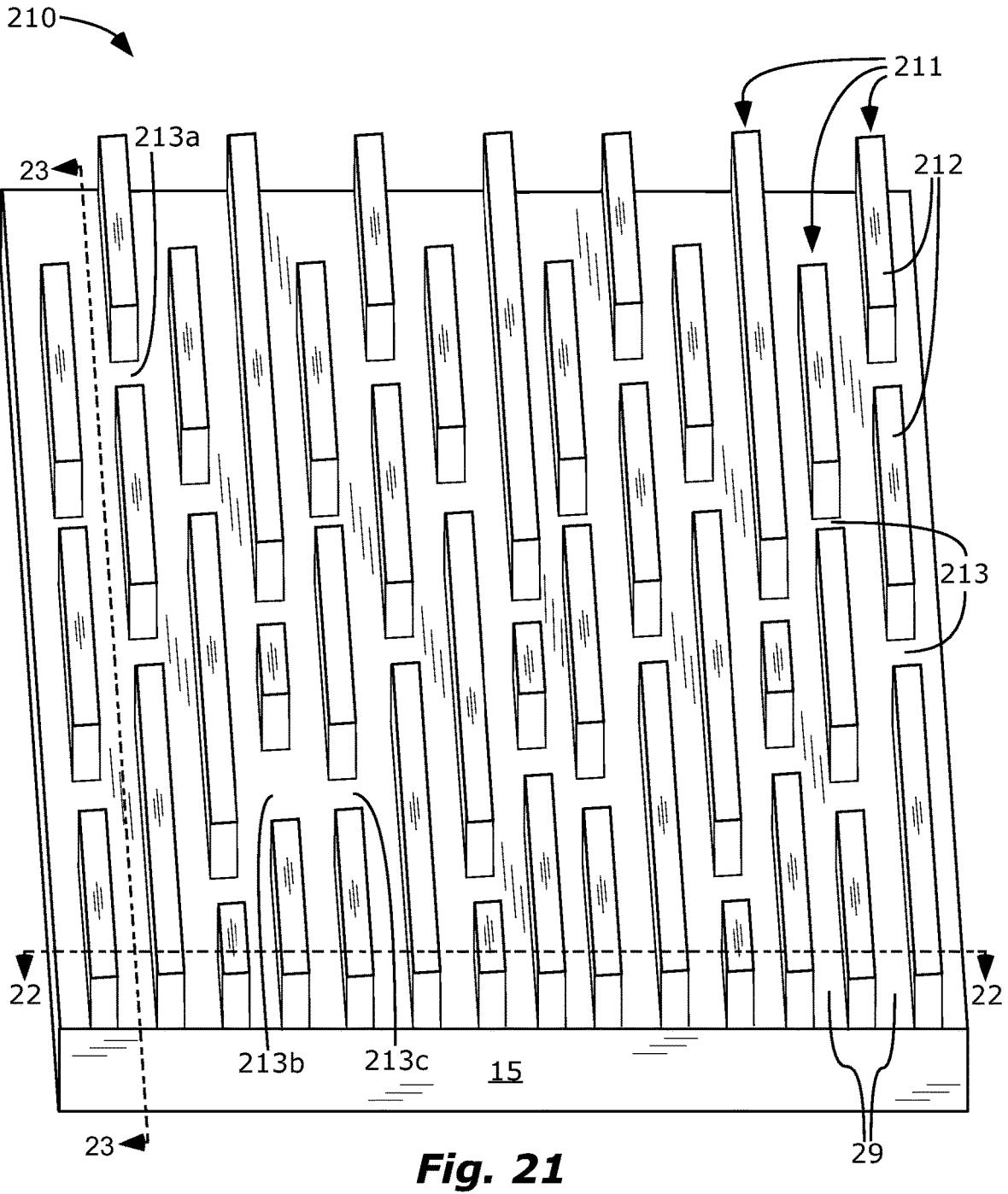

FIG. 21 is a perspective-view of a flexible wire grid polarizer 210 with an array of linear rows 211 of wire segments 212 on a flexible substrate 15. Each segment 212 can be separated from adjacent segments 212 in the linear row 211 by a gap 213.

FIG. 22 is a cross-sectional end-view of the flexible wire grid polarizer 210 of FIG. 21 taken along line 22-22 in FIG. 21.

FIG. 23 is a side-view of the flexible wire grid polarizer 210 of FIG. 21 taken along line 23-23 in FIG. 21. The gaps 213 extend through the wire segments 212 to the substrate 15.

FIG. 24 is a side-view of a flexible wire grid polarizer 240, similar to wire grid polarizer 210. The gaps 213 in flexible wire grid polarizer 240 extend only partway through the wire segments 212. Thus, a bottom of each gap 213 can be a thinner region 243 of the wire segment 212.

FIG. 25 is a side-view of a flexible wire grid polarizer 250, similar to wire grid polarizers 210 and 240. Each wire segment 212 in flexible wire grid polarizer 250 includes a reflective rib 26 closer to the substrate 15 and an absorptive rib 25 farther from the substrate 15.

FIG. 26 is a cross-sectional side-view of a flexible wire grid polarizer 260 that is similar to flexible wire grid polarizers 210, 240, and 250. In flexible wire grid polarizer 260, the array of linear rows 211 of wire segments 212 are sandwiched between a first substrate 15$_a$ and a second substrate 15$_b$.

FIG. 27 is a cross-sectional side-view of a flexible wire grid polarizer 270 that is similar to flexible wire grid polarizers 210, 240, and 250. In flexible wire grid polarizer 270, a solid layer 35 on the wire segments 212 extends into the channels 29 between adjacent wires 21.

Figure 28:
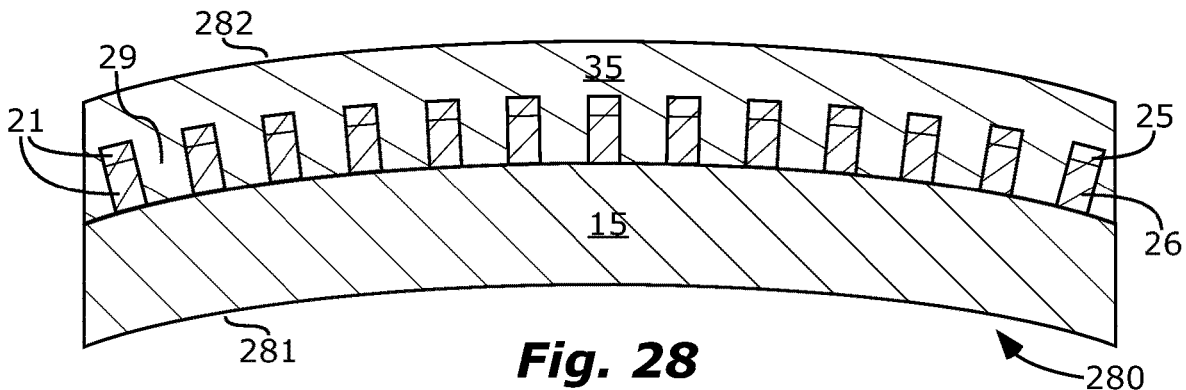

FIG. 28 is a cross-sectional end-view of a contact lens 280 with an embedded array of wires 21. Each wire 21 includes a reflective rib 26 closer to a concave face 281 and an absorptive rib 25 closer to a convex face 282.

Figure 29:
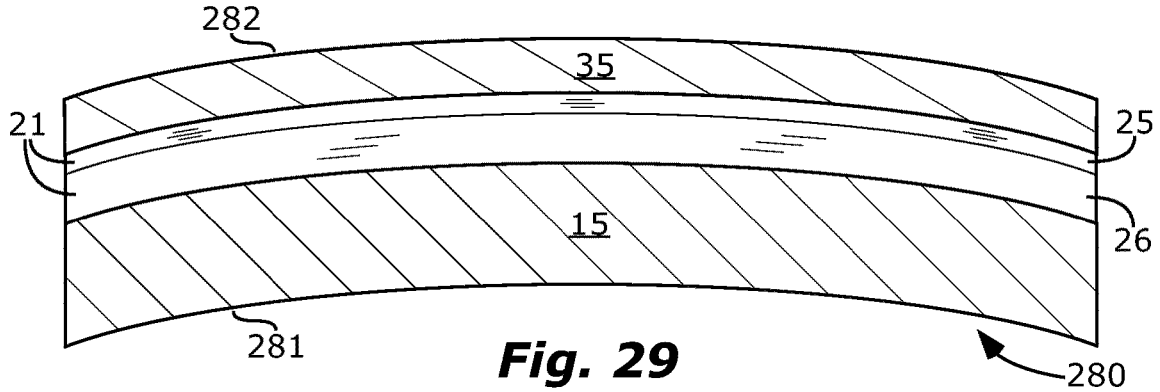

FIG. 29 is a side-view of the contact lens 280 of FIG. 19.

Figure 30:
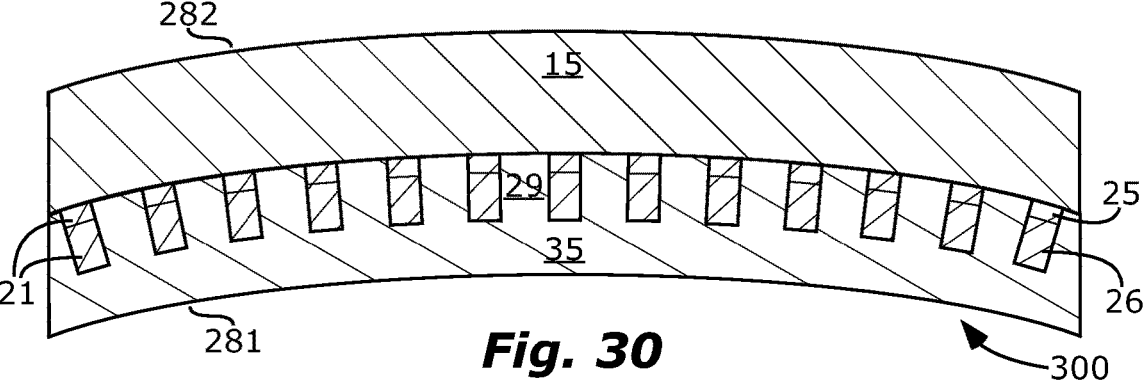

FIG. 30 is a cross-sectional end-view of a contact lens 300, similar to contact lens 280. In contact lens 300, the solid layer 35 is the concave face 281 and the flexible substrate 15 is the convex face 282.

DEFINITIONS

The following definitions, including plurals of the same, apply throughout this patent application.

As used herein, the term "cross shape" means two crossing elongated shapes, such as crossing bars, crossing wires, or crossing channels. The two crossing elongated shapes can have the same or different length with respect to each other.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "flexible" includes flexible, stretchable, and compressible.

As used herein, the term "opaque" means blocking the passage of electromagnetic energy.

As used herein, the term "parallel" means exactly parallel; parallel within normal manufacturing tolerances; or almost exactly parallel, such that any deviation from exactly parallel would have negligible effect for ordinary use of the device.

As used herein, the term "perpendicular" means exactly perpendicular; perpendicular within normal manufacturing tolerances; or almost exactly perpendicular, such that any deviation from exactly perpendicular would have negligible effect for ordinary use of the device.

As used herein, the phrases "same material composition" and "same thickness" each mean exactly the same; the same within normal manufacturing tolerances; or almost exactly the same, such that any deviation from exactly the same would have negligible effect for ordinary use of the device.

As used herein, the phrases "circular shape", "elliptical shape", "square shape", "rectangular shape", and "parallelogram" each mean these exact shapes; these shapes within normal manufacturing tolerances; or almost these exact shapes, such that any deviation from these exact shapes would have negligible effect for ordinary use of the device.

As used herein, the ultraviolet spectrum means electromagnetic radiation with wavelengths≥10 nm & <400 nm, the visible spectrum means electromagnetic radiation with wavelengths≥400 nm & <700 nm, the near infrared spectrum means electromagnetic radiation with wavelengths≥700 nm & ≤1400 nm, and the infrared spectrum means electromagnetic radiation with wavelengths≥700 nm & ≤1 mm.

As used herein, the terms "nm" means nanometers, "μm" means micrometers, "MPa" means megapascals, and "GPa" means gigapascals.

Unless explicitly noted otherwise herein, all temperature-dependent values are such values at 25° C.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

DETAILED DESCRIPTION

Optical devices with different regions or pixels can form an image. The different pixels can improve analysis or the quality of the image. An opaque-region 14 can be used to separate different pixels. The opaque-region 14 may also be used next to a lens, a polarizer, an aperture, etc.

Sometimes the optical device needs to be flexible, for elongation or stretching onto a curved surface, for removal from a rigid substrate before subsequent processing, or for transfer printing. The opaque-region 14, however, can be damaged as it is stretched, bent, compressed, or relaxed after removal from a rigid substrate. A thin film 12 of the opaque-region 14 can crack or delaminate as it is stretched, compressed, or bent. The thin-film 12 can be metallic.

A flexible optical device can include a modified opaque-region 14 for improved flexibility, improved adhesion to a flexible layer during assembly or transfer printing processes, or both. The opaque-region 14 can include a thin-film 12 with multiple cavities 13; multiple, separate zones 63; or both. Each zone 63 can be encircled and separated from adjacent zones 63 by a groove 62. The cavities 13, the separate zones 63, or both can allow the opaque-region 14 to bend or stretch without (or with reduced) cracking or delamination of the thin-film 12.

Although the opaque-region 14 may have cavities 13, grooves 62, or both, it can be designed as described herein to block a large percent of incident light. For example, the opaque-region 14 may block≥80%, ≥90%, ≥95%, ≥98%, ≥99%, ≥99.5%, or ≥99.9% of incident light. This blocking can be across the ultraviolet light spectrum, across a wavelength range of 500 nm through 700 nm, across the visible light spectrum, across the near infrared light spectrum, across the infrared light spectrum, or combination thereof.

One example flexible optical device 10 is illustrated in FIGS. 1*a*-1*b*, including an opaque-region 14 between two polarizer regions 11. The polarizer regions 11 and the opaque-region 14 can be located on a single, flexible substrate 15. The substrate 15 can be monolithic, continuous, integral, and homogeneous. The substrate 15 can have the same material composition throughout. The substrate 15 can be a polymer.

The opaque-region 14 can be adjacent to multiple polarizer regions 11, as illustrated in FIGS. 1*a*-1*b*, or adjacent to a single polarizer region 11. In either case, the polarizer region(s) 11 and the opaque-region 14 can be formed in a single layer of material 52 (see FIG. 5 and the method description below). The single layer of material 52 can be monolithic, continuous, integral, and homogeneous. The single layer of material 52 can have the same material composition throughout. The single layer of material 52 can be on the flexible substrate 15.

By forming the opaque-region 14 and the polarizer region(s) 11 from a single layer of material 52, the array of wires 21 of the polarizer region(s) 11 and the thin-film 12 of the opaque-region 14 can have the same material composition. Also, the array of wires 21 of the polarizer region(s) 11 and the thin-film 12 of the opaque-region 14 can have the same thickness ($Th_{11a}=Th_{12}=Th_{11b}$). Example thicknesses ($Th_{11a}$, $Th_{12}$, $Th_{11b}$, or combinations thereof) include ≥10 nm, ≥100 nm, ≥150 nm, or ≥250 nm; and ≤250 nm, ≤500 nm, or ≤2 μm.

As illustrated in FIGS. 1*a*-1*b*, the polarizer regions 11 can be wire grid polarizers. The polarizer regions 11 can each include an array of wires 21 with channels 29 between adjacent wires 21. The channels 29 can be filled with vacuum, air or other gas, or solid material. The channels 29 can extend through material of the wires 21 to the substrate 15. Alternatively, the channels 29 can extend only part-way through material of the wires 21, with this material linking adjacent wires 21.

The array of wires 21 of one of the polarizer regions 11 can be a first-array $11_a$. Wires 21 of the first-array $11_a$ can extend in a first-direction $D_a$. The array of wires 21 of the other of the polarizer regions 11 is a second-array $11_b$. Wires 21 of the second-array $11_b$ can extend in the same direction $D_a$ or a second-direction $D_b$. The first-direction and the second-direction can be different with respect to each other. Thus, the opaque-region 14 can be located by (between, adjacent to, or both) different wire grid polarizer pixels. The opaque-region 14 can adjoin the wire grid polarizer pixels. The first-array $11_a$ and the second-array $11_b$ can have other differences with respect to each other, including those described in U.S. Pat. No. 8,873,144, which is incorporated herein by reference.

The polarizer region(s) 11 can be replaced by any other optical region(s) or device(s), such as for example a lens, a metalens, a diffraction grating, a phase mask, a retarder, an optical filter, or an aperture.

As illustrated in FIGS. 1*a*-1*b*, the opaque-region 14 can include a thin-film 12 with multiple cavities 13. Alternatively, the opaque-region 14 with cavities 13 can be replaced by an opaque-region 14 as described below. For example, the thin-film 12 can include multiple, separate zones 63.

As illustrated in FIG. 1*b*, the opaque-region 14 can include cavities 13 extending through the thin-film 12 to the substrate 15.

As illustrated in FIG. 2*a*, the opaque-region 14 can include cavities 13 extending partway through the thin-film 12. Thus, a bottom of each cavity 13 can be a thinner region 24 of the thin-film 12.

Cavities 13 extending through the thin-film 12 to the substrate 15 (FIG. 1*b*), or cavities 13 partway through the thin-film 12 (FIG. 2*a*), can be applied to any other examples described herein.

The cavities 13 can be spaced and sized to allow sufficient flexibility of the opaque-region 14, but also block a large percent of incident light. Following are example relationships between a maximum width W of the cavities 13 and a maximum distance D between adjacent cavities 13. A minimum W/D ratio can be selected for sufficient flexibility, such as for example 0.05≤W/D, 0.15≤W/D, 0.25≤W/D, or 1≤W/D. A maximum W/D ratio can be selected for sufficient blocking of light, such as for example W/D≤0.35, W/D≤0.45, W/D≤0.55, or W/D≤2. The width W and the distance D are measured at a face of the thin-film 12 farthest from the substrate 15. Cavities 13 with these dimensions can be applied to any cavity 13 example herein.

Reflected light can cause problems in some optical devices. For example, if the optical device is part of a contact lens, then reflected light can cause the eyeball of the wearer to look strange. An outer layer of the optical device can be a material that is absorptive of incident light, such as silicon or germanium. An inner layer of the optical device can be a material that is reflective of incident light, such as aluminum, silver, or other metal.

The polarizer regions 11 of flexible optical device 20*b* in FIG. 2*b* include an array of wires 21, and a channel between each pair of adjacent wires. Each wire 21 can include a reflective rib 26 and an absorptive rib 25. The reflective rib 26 can be closer to the substrate 15 and the absorptive rib 25 can be farther from the substrate. The reflective rib 26 can adjoin the substrate 15, can adjoin the absorptive rib 25, or can adjoin both.

The thin-film 12 of the opaque-region 14 can include a reflective layer 28 and an absorptive layer 27. The reflective layer 28 can be closer to the substrate 15 and the absorptive layer 27 can be farther from the substrate 15. The cavities 13, the groove 62 (described below), or both can extend through the reflective layer 28 and the absorptive layer 27.

The reflective rib 26 and the absorptive rib 25 can be used in any wire grid polarizer example described herein. The reflective layer 28 and the absorptive layer 27 can be used with any opaque-region 14 example described herein.

The polarizer regions 11 and the opaque-region 14 might need protection. As illustrated in FIG. 3a, the polarizer regions 11, the opaque-region 14, or both can be sandwiched between a first substrate 15$_a$ and a second substrate 15$_b$. Each substrate 15$_a$ and 15$_b$ can be a single, flexible substrate that is continuous and integral across the polarizer regions 11 and the opaque-region 14. Sandwiching the polarizer regions 11 and the opaque-region 14 between the two substrates 15$_a$ and 15$_b$ can provide better protection for these optical devices. The opaque-region 14 sandwiched between a first substrate 15$_a$ and a second substrate 15$_b$ can be applied to any other opaque-region 14 example described herein.

Solid material in the cavities 13, in the grooves 62, in the channels 29, or combinations thereof can provide added protection to the optical device. As illustrated in FIG. 3b, a solid layer 35 can be on the polarizer regions 11 and on the opaque-region 14. The solid layer 35 can extend into the cavities 13 and the channels 29. The solid layer 35 can also extend into the grooves 62 as described below. The solid layer 35 can fill the cavities 13, the grooves 62, the channels 29, or combinations thereof. The polarizer regions 11 and the opaque-region 14 can be sandwiched between the solid layer 35 and the substrate 15.

The added solid layer 35 can be applied to any other examples described herein. The added solid layer 35 can be a polymer and can be flexible.

As illustrated in FIG. 4, the flexible optical device 40 can include an opaque-region 14 between or adjacent to two different polarizer regions 11. The polarizer regions 11 can include a first-array 11$_a$ of wires 21 and a second-array 11$_b$ of wires 21, extending in different directions with respect to each other. The first-array 11$_a$ and the second-array 11$_b$ can overlap to form the opaque-region 14. The cavities 13 of the opaque-region 14 can be intersecting channels 29 between the wires 21 of the arrays 11$_a$ and 11$_b$. The opaque-region 14 and polarizer regions 11 of FIG. 4, can be applied to any other examples described herein.

A method of making a flexible optical device can include some or all of the following steps. These steps can be performed in the following order or other order. Some of the steps can be performed simultaneously unless explicitly noted otherwise in the claims. Components of the flexible optical device can have properties as described above and below this method section.

The method can comprise (see FIGS. 1a-5):

(A) depositing a layer of material 52 on a flexible substrate 15;

(B) etching the layer of material 52 to form an optical component (e.g. a first-array 11$_a$ of wires 21) at a first region R1 of the layer of material 52;

(C) etching the layer of material 52 to form an optical component (e.g. a second-array 11$_b$ of wires 21) at a second region R2 of the layer of material 52;

(D) etching the layer of material 52 to form a flexible opaque-region 14 at third region R3 of the layer of material 52.

In step (A), depositing the layer of material 52 can include depositing a layer of reflective material 58 on the flexible substrate 15, then depositing a layer of absorptive material 57 on the layer of reflective material 58.

Step (B), step (C), or both may be omitted.

The first region R1, the second region R2, and the third region R3 can be separate regions of the layer of material 52.

The etching of step (D) can include etching to form multiple cavities 13, multiple zones 63 encircled and separated from each other by a groove 62, or both.

The pattern and etch of the method can be accomplished in two steps. A negative resist may be used. Step (A) can include patterning and exposing the first region R1 and extending this pattern onto the third region R3. Step (B) can include patterning and exposing the second region R2 and extending this pattern onto the third region R3. The pattern of the first region R1 can be wires 21 extending in one direction and the pattern of the second region R2 can be wires 21 extending in a different direction. Thus, a pattern of the third region R3 can be intersecting wires from the patterns of the first region R1 and of the second region R2, as shown in FIG. 4.

As illustrated in FIG. 6, the thin-film 12 of the opaque-region 14 can have multiple zones 63. Each zone 63 can have a square shape, a rectangular shape, or other shape. The zones 63 can be located on a single, flexible substrate 15. Each zone 63 can be encircled and separated from adjacent zones 63 by a groove 62. The groove 62 can completely encircle each zone 63, as illustrated in FIG. 6. Alternatively, the groove 62 can partially encircle each zone 63. For example, the groove 62 can encircle ≥50%, ≥75%, ≥90%, or ≥95% of each zone 63. The opaque-region 14 can be adjacent to another optical region, such as for example a lens, polarizer, aperture, etc.

Each groove 62 can extend completely through the thin-film 12 to the substrate 15. Each groove 62 can also extend into the flexible substrate 15.

Alternatively, the groove 62 can extend only partway through the thin-film 12. Thus, a bottom of each groove 62 can be a thinner region 24 of the thin-film 12 (see FIG. 2a).

Each zone 63 can include multiple cavities 13. The groove 62, the multiple cavities 13, or both can provide the opaque-region 14 with needed flexibility.

A number of cavities 13 in each zone 63 can be selected to allow sufficient flexibility of the opaque-region 14, but also block a large percent of incident light. A minimum number can be selected for sufficient flexibility, such as for example ≥4, ≥9, ≥16, ≥100, or ≥1000 cavities 13 in each zone 63. A maximum number can be selected for sufficient blocking of light, such as for example ≤16, ≤30, ≤49, ≤500, or ≤10,000 cavities 13 in each zone 63.

Each zone 63 can have a width W$_S$ selected to allow sufficient flexibility of the opaque-region 14, but also block a large percent of incident light. A smaller width W$_S$ can increase flexibility. A larger width W$_S$ can increase blocking of light. Example width W$_S$ ranges to balance these desirable characteristics include the following: All widths W$_S$ of the zones 63 can be ≥100 nm, ≥500 nm, ≥ or 1 μm; and ≤1 μm, ≤3 μm, ≤10 μm, ≤50 μm, or ≤250 μm. Each width can be measured between and perpendicular to an opposite side.

The opaque-region 14 of FIG. 6, with its zones 63, grooves 62, dimensions, and number of cavities 13 in each zone 63, can be applied to any other examples described herein.

FIG. 7 is a top-view of an opaque-region 14 having a thin-film 12 with multiple zones 63. Each zone 63 can be encircled and separated from adjacent zones 63 by a groove 62.

Each zone 63 can have any convenient shape, including rectangle, square, oval, circle, T shape, Z shape, or cross. A cross shape is illustrated in FIG. 7 as a preferred shape because the zones 63 of adjacent cross shapes fit closely together and the cross shape is effective at blocking all polarization states.

The two crossing bars 72 of the cross shapes can have a smallest angle between them that is ≥85°, ≥80°, ≥70°, ≥60°, or ≥45.

Two intersecting bars 72, perpendicular to each other, can form the cross shape. One bar 72 can cause reflection or absorption of one polarization. The other bar 72 can cause reflection or absorption of an opposite polarization. The bars 72 can intersect at angles close to 90°, such as for example between 85° and 95°, between 80° and 100°, between 70° and 110°, or between 60° and 120°.

Channel width variability can be small to help optimize flexibility and blockage of light. Thus, for example, a maximum width $W_{C1}$ of the channel(s) 62 divided by a minimum width $W_{C2}$ of the channel(s) 62 can be ≤1.5, ≤3, or ≤6. The maximum width $W_{C1}$ and the minimum width $W_{C2}$ are measured parallel to a longitudinal axis 71 of one of the bars 72. Examples lower boundaries of the maximum width $W_{C1}$ include $W_{C1}$≥5 nm, $W_{C1}$≥10 nm, $W_{C1}$≥20 nm, or $W_{C1}$≥50 nm. Examples upper boundaries of the maximum width $W_{C1}$ include $W_{C1}$≤20 nm, $W_{C1}$≤50 nm, $W_{C1}$≤100 nm, or $W_{C1}$≤500 nm.

All cross-shaped zones 63 can have one or more cavities 13, or all cross shaped zones 63 can be free of cavities 13. Some cross shaped zones 63 can have cavities 13 and other cross shaped zones 63 can be free of cavities 13.

For the opaque-regions 14 in FIGS. 6-7, the groove 62 can extend through the thin-film 12. Alternatively, the groove 62 can extend partway through the thin-film 12, and a bottom of each groove 62 can be a thinner region 24 of the thin-film 12, as illustrated in FIG. 2.

The opaque-region 14 of FIG. 7, with its zones 63, cross shape, dimensions, or combinations thereof can be applied to any other examples described herein.

As illustrated in FIGS. 8-9, the cross shapes of the thin-film 12 can include a first orientation 81 and a second orientation 82. The second orientation 82 can be rotated with respect to the first orientation 81. For example, an angle of this rotation with respect to each other can be ≥40° and ≤50°, ≥30° and ≤60°, or ≥20° and ≤70°. A 45° angle of rotation is preferred, as illustrated in FIGS. 8-9.

As illustrated in FIG. 9, the first orientation 81 can include a group of four crosses connected to each other, forming a larger cross 91 from adjacent crosses combined and smaller cross bars 92 from crosses that are not combined. The second orientation 82 can include a group of four crosses connected to each other to form a square-shape 95.

The four crosses in the first orientation 81 and in the second orientation 82 can be combined as shown in FIG. 9. This is preferred for blocking of light and improved flexibility of the opaque region 14. These two shapes (larger cross 91 with smaller cross bars 92 and the square-shape 95), however, can be used separately.

There can be an internal-cross 93 and 94 inside of the square-shape 95 formed by the four connected crosses in the second orientation 82. Each bar of the internal-cross 93 and 94 can extend diagonally across the square-shape 95 from corner to corner of the square-shape 95.

The internal-cross 93 can adjoin the corners of the square-shape 95. Alternatively, the internal-cross 94 can be spaced apart from and not touch the corners of the square-shape 95. There are only two internal-crosses 93 and 94 inside of the square-shapes 95 in FIG. 9; but there can be an internal-cross 93 or 94 inside of every one of the square-shapes 95.

The internal-crosses 93 and 94 can reduce light leakage. These internal-crosses 93 and 94 can have the first orientation 81.

As illustrated in FIG. 10, the thin-film 12 of the opaque-region 14 can include multiple zones 63. Each zone 63 can have intersecting wires 101 and 102 formed in the thin-film 12. Each zone 63 can be encircled and separated from adjacent zones 63 by a groove 62. Each zone 63 can include multiple cavities 13 formed by openings between the intersecting wires 101 and 102.

A number of intersections 103 in each zone 63 can be selected to allow sufficient flexibility of the opaque-region 14, but also block a large percent of incident light. A minimum number of intersections 103 can be selected for sufficient blocking of light, such as for example ≥4, ≥9, or ≥16 intersections 103 in each zone 63. A maximum number of intersections 103 can be selected for sufficient flexibility, such as for example ≤16, ≤49, ≤500, ≤10,000, or ≤50,000 intersections 103 in each zone 63.

As illustrated in FIG. 11, the thin-film 12 of the opaque-region 14 can be intersecting wires 101 and 102. Cavities 13 are formed between the intersecting wires 101 and 102. All or a large percent (e.g. ≥90%) of the wires can be interconnected, with few or no wires isolated from the group of intersecting wires 101 and 102.

For better blocking of orthogonal polarization states light, an angle of intersection A (FIGS. 10-11) of the intersecting wires 101 and 102 can be close to 90°. Thus, for example, the angle of intersection A can be ≥60°, ≥70°, ≥80°, or ≥85°; and ≤95°, ≤100°, or ≤110°, ≤120°.

The opaque-region 14 of FIG. 12 is similar to the opaque-regions 14 in FIGS. 10-11, except that in FIG. 12 each of the wires 101 and 102 has a serpentine or wavy shape. The serpentine or wavy shape can improve opaque-region 14 flexibility.

For the opaque-regions 14 in FIGS. 10-12, the groove 62 can extend through the thin-film 12. Alternatively, the groove 62 can extend partway through the thin-film 12. Thus, a bottom of each groove 62 can be a thinner region 24 of the thin-film 12, as illustrated in FIG. 2.

The opaque-region 14 of FIGS. 10-12, with their intersecting wires 101 and 102, can be applied to any other opaque-regions 14 described herein.

The cavities 13, as seen from a top face of the thin-film 12, can have various shapes. For example, the cavities 13 can have a circular shape or an elliptical shape (see FIGS. 1a and 6). The cavities 13 can have a square shape, a rectangular shape, or other parallelogram shape (see FIGS. 4 and 10-11).

The cavities 13 can have a hexagonal shape (see FIG. 13). The thin-film 12 in FIG. 13 forms intersecting hexagonal shapes.

As illustrated in FIGS. 14-17, the cavities 13 in the thin-film 12 can include cross shapes. The cavities can be aligned in an array of rows 141 and columns 142.

As illustrated in FIG. 14, a longitudinal axis 71 of each bar 72 in the cross shape can be aligned with a longitudinal axis 71 of a bar 72 in each cross shape of cavities in its row 141 or column 142.

As illustrated in FIGS. 15-16, a longitudinal axis 71 of each bar 72 in the cross shape can be aligned with a longitudinal axis 71 of a bar 72 in each cross shape of cavities in an offset row 141 and column 142. The longitudinal axes 71 can be aligned to the rows 151 and columns that are offset by 45° with respect to its row 141 or column 142. Thus, a diagonal line 151, 45° degrees offset to the row 141 and column 142, can be aligned with the longitudinal axis 71 of the bars 72.

As illustrated in FIGS. 14-15, ends 153 of the cross shape can be pointed. As illustrated in FIG. 16, ends 153 of the cross shape can be curved.

As illustrated in FIG. 17, adjacent cavities 13 in the thin-film 12 can have different shapes 171 and 172 with respect to each other. The two different shapes 171 and 172 can alternate in each row 141 and column 142. The two different shapes 171 and 172 can include a concave shape 171 and a convex shape 172.

A majority of an outer edge of the concave shape 171 can be concave as viewed from outside the shape. The concave shape 171 can have a cross shape.

A majority or all of an outer edge of the convex shape 172 can be convex as viewed from outside the shape.

As illustrated in FIGS. 18-20, the opaque-region 14 can include an etch stop 181 and a thin-film 12 on a flexible substrate 15. The etch stop 181 can help control etch formation of the cavities 13, channel(s) 62, or both in the thin-film 12. The etch stop 181 can help prevent contamination of the etcher tool. Without the etch stop 181, material of the substrate 15 could contaminate the etcher tool during etch of the thin-film 12.

As used herein, the term "etch stop" means a material that is more resistant to etching and that etches slower than the overlying material or material intentionally being etched (thin-film 12 in this case). For example, the etch rate of the thin-film 12 divided by the etch rate of the etch stop 181 can be $\geq 1.5$, $\geq 3$, $\geq 10$, $\geq 100$, $\geq 1000$.

The cavities 13, the channel(s) 62, or both can extend through the thin-film 12 and into or through the etch stop 181. Etch chemistry can be adjusted, after etch of the thin-film 12, to etch the etch stop 181. This etch into the etch stop 181 can reduce delamination of the thin-film 12 when it is stretched or compressed.

The cavities 13, the channel(s) 62, or both can extend through the thin-film 12, through the etch stop 181, and into the substrate 15, forming substrate ribs 182. Etch chemistry can be adjusted, after etch of the etch stop 181, to etch into the substrate 15. This etch into the substrate 15 can improve flexibility of the opaque-region 14. Example etch depth D into the substrate 15 of the cavities 13, the channel(s) 62, or both includes $D \geq 5$ nm, $D \geq 10$ nm, or $D \geq 25$ nm; and $D \leq 35$ nm, $D \leq 75$ nm, or $D \leq 500$ nm.

The opaque-region 14 of FIGS. 18-20 can be combined with any other opaque-region 14 examples described herein.

As illustrated in FIGS. 21-27, flexible wire grid polarizers 210, 240, 250, 260, and 270 can include an array of linear rows 211 of wire segments 212 on a flexible substrate 15. The rows 211 can be parallel with respect to each other. Each segment 212 can be separated from adjacent segments 212 in the linear row 211 by a gap 213. The gaps 213 can allow flexibility of the wire grid when the substrate 15 flexes.

Each linear row 211 can include many wire segments 212 for improved flexibility, such as for example $\geq 1$, $\geq 3$, $\geq 5$, $\geq 10$, $\geq 100$, $\geq 200$, $\geq 2000$, or $\geq 8000$ segments 212.

The wire segments 212 can have a length $L_S$ with a minimum value for better polarization filtering. For example, at least 50%, at least 90%, at least 95%, or all of the wire segments 212 can have a length $L_S$ that is $\geq 400$ nm, $\geq 600$ nm, or $\geq 1$ µm.

The wire segments 212 can have a length $L_S$ with a maximum value to provide the optical device with better flexibility, elasticity, or both. For example, at least 50%, at least 90%, at least 95%, or all of the wire segments 212 can have a length $L_S$ that is $\leq 1$ µm, $\leq 5$ µm, $\leq 10$ µm, $\leq 50$ µm, or $\leq 500$ µm.

A width $W_G$ of the gaps 213 can be selected to improve polarization filtering (a smaller gap 213 is better to reduce leakage of the unwanted polarization state) while also providing sufficient flexibility (a larger gap 213 is better). The width $W_G$ of the gaps 213 is measured parallel with a longitudinal axis of the wire segments 212 in the linear row 211. For example, at least 50%, at least 90%, at least 95%, or all of the gaps 213 can have a width $W_G$ that is $\geq 5$ nm, $\geq 25$ nm, $\geq 50$ nm, or $\geq 100$ nm. At least 50%, at least 90%, at least 95%, or all of the gaps 213 can have a width $W_G$ that is $\leq 75$ nm, $\leq 100$ nm, $\leq 250$ nm, or $\leq 1$ µm.

The gaps 213 can be offset with respect to gaps 213 of adjacent rows 211. For example, gap 213a is offset, but gap 213b is adjacent to a gap 213c in an adjacent row 211. It is preferred for the gaps 213 to be offset with respect to gaps 213 of adjacent rows, like gap 213a, for better polarizer contrast (reduced leakage of unwanted state), and/or for reduced scattering or diffraction. For example, $\geq 80\%$, $\geq 90\%$, $\geq 95\%$, or all of the gaps 213 can be offset with respect to gaps 213 of adjacent rows 211.

As illustrated in FIG. 22-23, the gaps 213 can extend through the wire segments 212 to the substrate 15. This is preferred for improved wire grid polarizer flexibility.

As illustrated in FIG. 24, the gaps 213 can extend partway through the wire segments 212. Thus, a bottom of each gap 213 can be a residual 243 of material of the wire segments 212. This is preferred for improved polarization.

A ratio of a thickness $Th_R$ of the residual 243 to a thickness $Th_S$ of the wire segments 212 can be selected for optimizing wire grid polarizer flexibility and polarization. For example, $Th_R/Th_S$ can be at least $\geq 0.005$, $\geq 0.01$, $\geq 0.1$, or $\geq 0.25$. A maximum of $Th_R/Th_S$ can be $\leq 0.1$, $\leq 0.25$, $\leq 0.5$, or $\leq 0.9$.

As illustrated in FIG. 25, each wire segment 212 can include a reflective rib 26 and an absorptive rib 25. The reflective rib 26 can be closer to the substrate 15 and the absorptive rib 25 can be farther from the substrate 15.

As illustrated in FIG. 26, the array of linear rows 211 of wire segments 212 can be sandwiched between the first substrate $15_a$ and a second substrate $15_b$. The second substrate $15_b$ can improve protection of the wire segments 212.

As illustrated in FIG. 27, flexible wire grid polarizer 270 can include a solid layer 35 on the wire segments 212. The solid layer 35 can extend into the channels 29 between adjacent wires 21. The solid layer 35 can fill the channels 29. The solid layer 35 can be a polymer and can be flexible.

Following are possible characteristics of the flexible substrate 15 for any of the example devices described herein. The flexible substrate 15 can comprise a gel, a polymer, or both. The gel can comprise a colloidal gel, a polymeric gel, or both. The flexible substrate 15 can comprise a weight percent of $\geq 50\%$, $\geq 70\%$, $\geq 90\%$, $\geq 95\%$, or $\geq 99\%$ polymer.

The flexible substrate 15 can comprise polydimethylsiloxane, polyimide, or both. Example Modulus of Elasticity values for the flexible substrate 15 include $\leq 5$ GPa, $\leq 10$ GPa, $\leq 30$ GPa, or $\leq 100$ GPa. The Modulus of Elasticity of the flexible substrate 15 can be $\geq 0.1$ MPa, $\geq 0.5$ MPa, or $\geq 1$ MPa.

A contact lens can include a wire grid to polarize light, as part of a vision enhancement system. As illustrated in FIGS. 28-30, contact lens 280 and 300 can include an embedded array of wires 21 with a channel 29 between each pair of adjacent wires 21.

Each wire 21 can include a reflective rib 26 closer to a concave face 281 of the contact lens 280 and an absorptive rib 25 closer to a convex face 282 of the contact lens 280. The convex face 282 can face away from a user of the contact lens 280 or 300. The absorptive ribs 25 can absorb light, so that it is not reflected to observers. Without the absorptive ribs 25, the eyes of the user of the contact lens 280 and 300 would look unusual.

The wires 21 can be formed on a flexible substrate 15. A solid layer 35 can be applied on wires 21. The solid layer 35 can extend into the cavities 13 and the channels 29. The solid layer 35 can fill the channels 29.

An outer side of the flexible substrate 15 can be the concave face 281, as illustrated in FIGS. 28-29, or can be the convex face 282, as illustrated in FIG. 30.

What is claimed is:

1. A flexible optical device comprising:

different regions comprising an opaque-region adjacent to another optical region comprising one or more of a lens, a polarizer, an aperture, a metalens, a diffraction grating, a phase mask, a retarder, or an optical filter;

the opaque-region and the another optical region located on a flexible substrate;

the opaque-region capable of blocking ≥90% of ultraviolet light, ≥90% of visible light, ≥90% of near infrared light, or combinations thereof; and the opaque-region includes a thin-film with multiple cavities.

2. The device of claim 1, wherein $0.15 \leq W/D \leq 0.45$, where W is a maximum width of the cavities and D is a maximum distance between adjacent cavities, the width and the distance measured at a top face of the thin-film farthest from the substrate.

3. The device of claim 1, wherein the thin-film includes a reflective layer closer to the substrate and an absorptive layer farther from the substrate.

4. The device of claim 1, further comprising an etch stop between the thin-film and the substrate, and wherein the cavities extend through the thin-film and through the etch stop.

5. The device of claim 4, wherein the cavities extend into the substrate for a depth of at least 10 nm.

6. A flexible optical device comprising:

different regions comprising an opaque-region adjacent to another optical region comprising one or more of a lens, a polarizer, an aperture, a metalens, a diffraction grating, a phase mask, a retarder, or an optical filter;

the opaque-region and the another optical region located on a flexible substrate;

the opaque-region capable of blocking ≥90% of ultraviolet light, ≥90% of visible light, ≥90% of near infrared light, or combinations thereof; and the opaque-region includes a thin-film with multiple zones, and each zone is encircled and separated from adjacent zones by a groove.

7. The device of claim 6, wherein each zone includes a cavity.

8. The device of claim 6, wherein the groove extends through the thin-film.

9. The device of claim 6, wherein the thin-film includes a reflective layer closer to the substrate and an absorptive layer farther from the substrate.

10. The device of claim 6, further comprising an etch stop between the thin-film and the substrate, and wherein the groove extends through the thin-film and through the etch stop.

11. The device of claim 10, wherein the groove extends into the substrate for a depth of at least 10 nm.

12. The device of claim 6, wherein:

each zone has a cross shape;

two intersecting bars, perpendicular to each other, form the cross shape; and a maximum width of the groove divided by a minimum width of the groove is ≤3, where the maximum width and the minimum width are measured parallel to a longitudinal axis of one of the bars.

13. The device of claim 6, wherein:

each zone has a cross shape;

two intersecting bars, perpendicular to each other, form the cross shape;

$10 \leq W_B/W_C \leq 20$, where $W_B$ is length of one of the bars, measured at a centerline of a longitudinal axis of the bar, and perpendicular to the other bar, and $W_C$ is a width of the groove measured adjacent to an end and parallel to $W_B$.

14. The device of claim 6, wherein:

each zone has a minimum width of ≥100 nm and a maximum width of ≤50 μm.

15. The device of claim 1, wherein the another optical region transmits some light.

16. The device of claim 1, wherein the another optical region comprises a wire grid polarizer.

17. The device of claim 6, wherein the another optical region transmits some light.

18. The device of claim 6, wherein the another optical region comprises a wire grid polarizer.

19. The device of claim 1, wherein the multiple cavities enable the opaque-region to bend or stretch without cracking or delamination of the thin-film.

20. The device of claim 6, wherein the groove enables the opaque-region to bend or stretch without cracking or delamination of the thin-film.

* * * * *